United States Patent
Tatsumi

(10) Patent No.: US 9,584,222 B2
(45) Date of Patent: Feb. 28, 2017

(54) DRIVING CIRCUIT FOR DRIVING NON-LINEAR OPTICAL MODULATOR BY SIGNAL HAVING PLURAL LOGIC LEVELS

(71) Applicant: SUMITOMO ELECTRIC INDUSTRIES, LTD., Osaka (JP)

(72) Inventor: Taizo Tatsumi, Kamakura (JP)

(73) Assignee: SUMITOMO ELECTRIC INDUSTRIES, LTD., Osaka (JP)

(*) Notice: Subject to any disclaimer, the term of this patent is extended or adjusted under 35 U.S.C. 154(b) by 36 days.

(21) Appl. No.: 14/644,610

(22) Filed: Mar. 11, 2015

(65) Prior Publication Data

US 2015/0263812 A1    Sep. 17, 2015

(30) Foreign Application Priority Data

Mar. 12, 2014 (JP) ................. 2014-048852

(51) Int. Cl.
| | |
|---|---|
| H04B 10/04 | (2006.01) |
| H04B 10/50 | (2013.01) |
| H04B 10/54 | (2013.01) |
| H04B 10/588 | (2013.01) |

(52) U.S. Cl.
CPC ......... H04B 10/505 (2013.01); H04B 10/541 (2013.01); H04B 10/588 (2013.01)

(58) Field of Classification Search
CPC ............................ H04B 10/524; H04B 10/58
See application file for complete search history.

(56) References Cited

U.S. PATENT DOCUMENTS

| | | | | |
|---|---|---|---|---|
| 2005/0134306 A1* | 6/2005 | Stojanovic | ............ | H04L 25/028 326/31 |
| 2010/0102884 A1* | 4/2010 | Takaso | ................ | H03F 3/45085 330/252 |
| 2010/0148869 A1* | 6/2010 | Kawakami | ................ | H03F 1/56 330/255 |
| 2010/0246647 A1* | 9/2010 | Maillard | .................. | H04B 1/58 375/220 |
| 2012/0249232 A1* | 10/2012 | Tatsumi | .............. | H03F 3/45089 330/53 |

FOREIGN PATENT DOCUMENTS

| | | |
|---|---|---|
| JP | H01-261905 | 10/1989 |
| JP | H11-305175 | 11/1999 |
| JP | 2012-215662 | 11/2012 |

OTHER PUBLICATIONS

Daniel Kucharski, et al., "Jitter Considerations in the Design of a 10-Gb/s Automatic Gain Control Amplifier", IEEE Transactions on Microwave Theory and Techniques, vol. 53, No. 2, Feb. 2005, pp. 590-597.

* cited by examiner

*Primary Examiner* — Dzung Tran

(74) *Attorney, Agent, or Firm* — Smith, Gambrell & Russell, LLP.

(57) ABSTRACT

A driving circuit for an optical modulator is disclosed. The driving circuit includes a differential amplifier and a DC-level equalizer. The differential amplifier amplifies a differential input signal consisting of a positive-phase signal and a negative-phase signal, and outputs a driving signal to the optical modulator. The DC-level equalizer superposes two bias levels to the positive-phase and negative-phase signals respectively, and adjusts the bias levels thereof to equalize respective peak or bottom levels of the positive-phase and negative-phase signals.

9 Claims, 23 Drawing Sheets

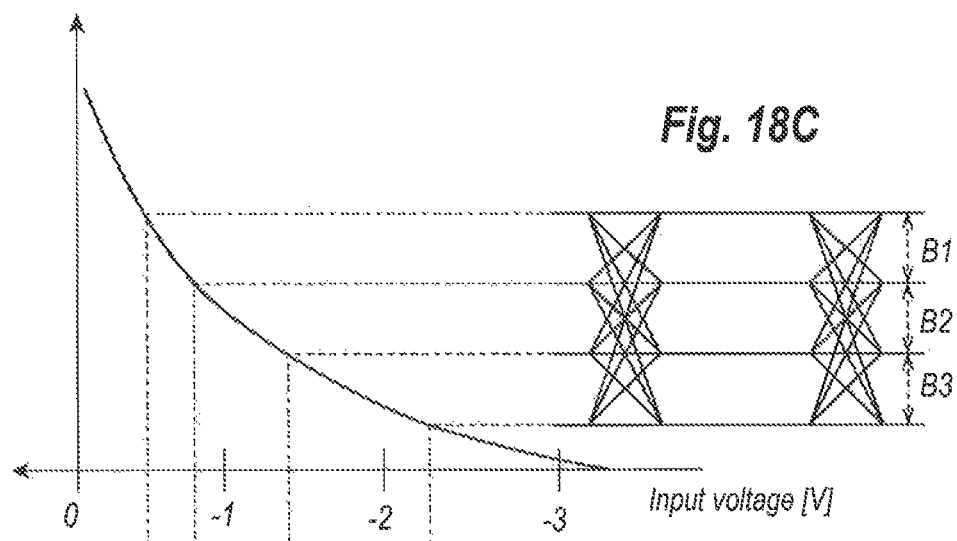
Fig. 18A
Fig. 18C
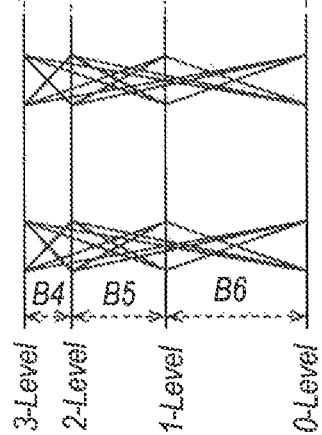
Fig. 18B

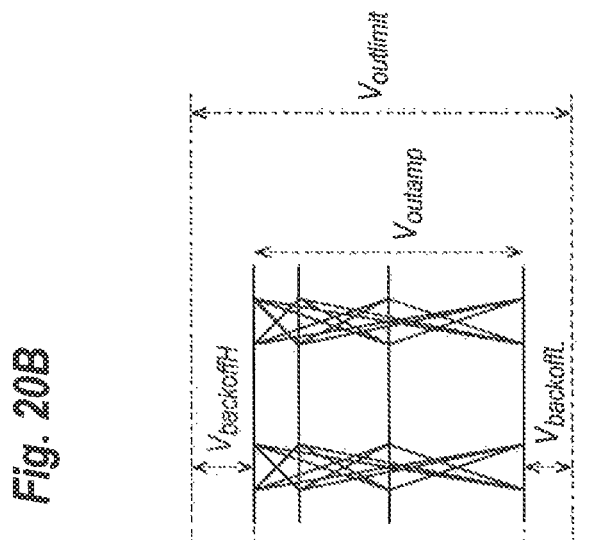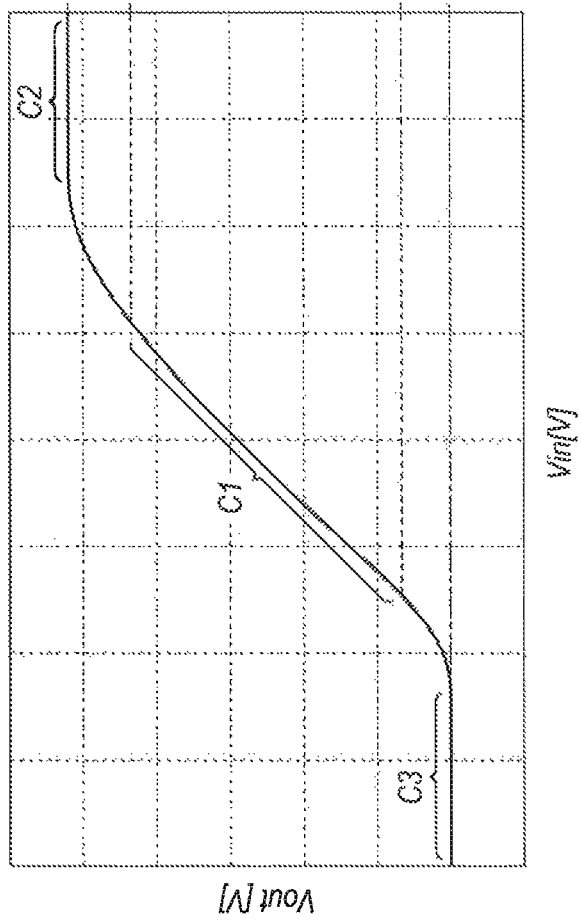
Fig. 20A
Fig. 20B

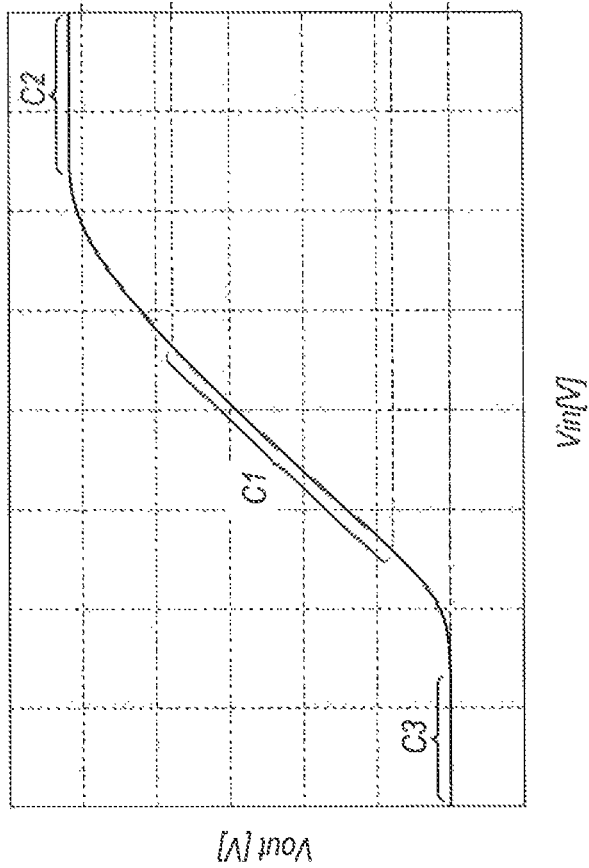

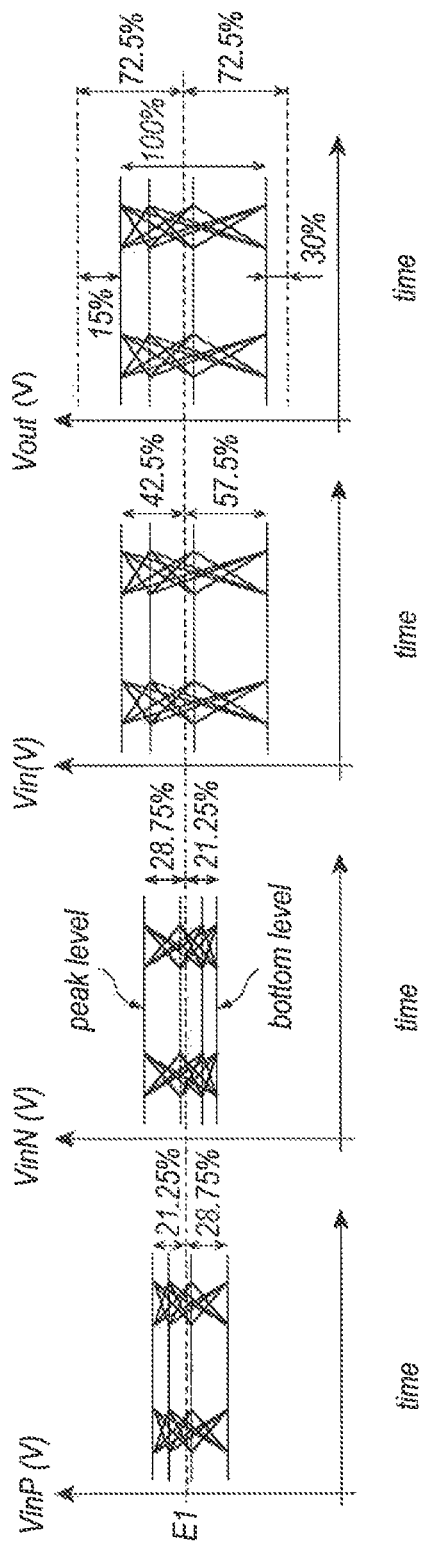

US 9,584,222 B2

DRIVING CIRCUIT FOR DRIVING NON-LINEAR OPTICAL MODULATOR BY SIGNAL HAVING PLURAL LOGIC LEVELS

BACKGROUND OF THE INVENTION

1. Field of the Invention

The present application relates to a driving circuit, in particular, the application relates to a driving circuit for transmitting an optical signal with a plurality of logic levels applicable to the Pulse Amplitude Modulation (PAM) system.

2. Background Arts

In optical transmission systems of core communication networks and local communication systems between servers in data centers, optical transceivers, which is are commonly used to convert electrical signals to optical signals and vice versa, transmit the optical signals with other optical transceivers in high speed.

Generally, such an optical transceiver comprises a transmission part (optical transmitter) and a reception part (optical receiver). The transmission part comprises a semiconductor laser as a light source, an optical modulator, and a driving circuit in order to convert an electrical signal to an optical signal and transmit the optical signal into an optical fiber cable. The optical modulator modulates a CW (Continuous Wave) light provided from the light source by a driving signal. The driving circuit provides the driving signal and also a bias level as a reference of the driving signal. Such a modulation system using a light source and an optical modulator is called as the external modulation system. Specifically, some optical transceivers use Electroabsorption Modulated Laser (EML), in which an Electro-Absorption Modulator (EAM) and a semiconductor laser are integrated on the same semiconductor chip, to meet the requirements of the miniaturization and the low power consumption for downsizing the optical transmission system and increasing the communicating channels into the optical transmission systems in higher density.

Optical transceivers have some specific external forms, called Form Factor, for instance, XFP, QSPP+, CFP, and so on. Each of the form factor is individually defined by MSA (Multi-Source Agreement), a kind of industry standard, which specifies not only the external dimensions of an optical transceiver but also electrical and optical characteristics, communication protocols with a host system for monitoring and control, arrangement of pin outs, and so on. Currently, CFP MSA has been established as a standard of the 100 Gbps optical transceiver and some commercial products have been released and delivered. The CFP optical transceiver brings a 100 Gbps transmission technology to the optical transmission systems by using some leading-edge techniques like WDM (Wavelength Division Multiplexing) of 4 wavelength channels and the 25 Gbps transmission per channel. In addition., Pulse Amplitude Modulation (PAM) system has been recently studied as a candidate of a new 100 Gbps transmission technology.

SUMMARY OF THE INVENTION

An aspect of the present application relates to a driving circuit to drive an optical modulator having a nonlinear characteristic between a driving signal provided from the driving circuit and an optical output. The driving circuit of the application includes a first differential amplifier and a DC-level equalizer. The first differential amplifier amplifies a differential input signal and output the driving signal. The differential input signal includes a positive-phase signal and a negative-phase signal each having more than two logic levels. The logic levels have inter-level amplitudes between two neighbor logic levels and a peak level which is the highest level of the logic levels. Each of the inter-level amplitudes is different from others. The DC-level equalizer equalizes the peak level of the positive-phase signal with the peak level of the negative-phase signal by superposing a first bias level on the positive-phase signal and a second bias level on the negative-phase signal.

BRIEF DESCRIPTION OF THE DRAWINGS

The foregoing and other purposes, aspects and advantages will he better understood from the following detailed description of preferred embodiments of the invention with reference to the drawings, in which:

FIGS. 18A to 18C show a relationship between an EAM driving signal, equivalently, an electrical input signal, and an optical output signal in the PAM-4 system.

FIGS. 20A and 20B are representative examples of the transfer characteristics of an amplifier and an eye-pattern of a driving signal in a linear region of the PAM-4 system, respectively.

FIGS. 21A and 21B are representative examples of the transfer characteristics of an amplifier and an eye-pattern of a driving signal in a linear region of the PAM-4 system, respectively.

FIGS. 22A to 22D are examples of eye patterns of the positive-phase signal, the negative-phase signal, the differential input signal, and the driving signal under the condition that the respective peak levels of the positive-phase and negative-phase signals are equalized by the DC-level equalizer.

DESCRIPTION OF EMBODIMENTS

Next, some embodiments of the present application will be described as referring to drawings. In the description of the drawings, numerals or symbols same with or similar to each other will refer to elements same with or similar to each other without duplicated explanations, (First Embodiment)

Figure 1:
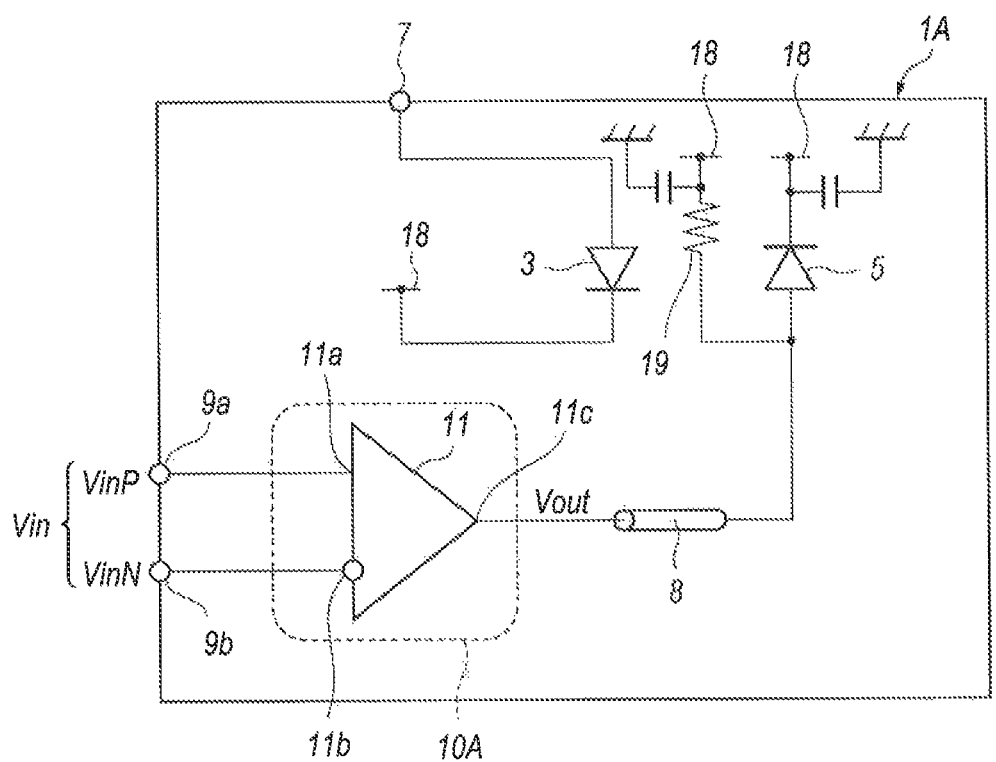
FIG. 1 is a schematic diagram of an optical transmitter module including a driving circuit of one embodiment of the present application.

FIG. 1 is a schematic diagram of an optical transmitter module including a driving circuit of the first embodiment, The optical transmitter module 1A includes a laser diode 3, an Electro-Absorption Modulator (EAM) 5, and a driving circuit 10A. The laser diode 3 emits a Continuous Wave (CW) light with a certain wavelength in the wavelength band specified for the optical transmission signal, The anode of the laser diode 3 is connected to an external bias voltage Vbias through a bias terminal 7 and the cathode of the laser diode 3 is connected to a voltage line 18. Most of the EMLs need a common voltage applied to the respective cathodes of the laser diode 3 and the EAM 5 on a semiconductor chip. In such EMLs, the bias voltage Vbias should be higher than the voltage Vcc of the voltage line 18. However, when respective cathodes of the laser diode 3 and the EAM 5 are separated to each other, for instance, and the cathode of the laser diode 3 can be connected to the ground instead of the voltage Vcc, the bias voltage Vbias can be a positive voltage smaller than Vcc. The EAM 5 modulates the CW light emitted from the laser diode 3 by a driving signal Vout and outputs a pulse-modulated optical signal as the optical transmission signal. The cathode of the EAM 5 is connected to the voltage Vcc, and the anode of the EAM 5 receives the driving signal Vout from the driving circuit 10A through a transmission line 8. A resistor 19 is connected to the EAM 5 in parallel for matching the input impedance with the transmission line 8 to restrain the reflection of high frequency components contained in the driving signal Vout. The resistance of the resistor 19 is set to be equal to the characteristic impedance of the transmission line 8, for instance, 50 Ohm. Further, another type of an optical modulator with the nonlinear input-output characteristics (transfer characteristics) may be used instead of the EAM 5.

The driving circuit 10A outputs the driving signal Vout to the EAM 5. The driving signal Vout for the PAM system varies the amplitude thereof depending on a differential input signal Vin. The driving circuit 10A includes a linear differential. amplifier 11 (first differential amplifier). The differential input signal Vin consists of a pair of a positive-phase signal VinP and a negative-phase signal VinN. The positive-phase signal VinP and the negative-phase signal VinN have respective phases opposite to each other. When the positive-phase signal VinP increases, the negative-phase signal VinN decreases complimentarily. When the positive-phase signal VinP decreases, the negative-phase signal VinN increases complimentarily. The positive phase signal VinP is input to a positive-phase input terminal 11a of the linear differential amplifier 11 through a signal input terminal 9a of the optical transmitter module 1A. The negative phase signal VinN is input to a negative-phase input terminal 11b of the linear differential amplifier 11 through an input terminal 9b of the optical transmitter module 1A. The driving signal Vout output from the linear differential amplifier 11 at an output terminal 11C thereof has amplitude depending on a difference between the positive-phase and negative-phase signals, VinP and VinN. The voltage gain of the linear differential amplifier 11 is, for instance, the unity, namely |Vout/Vin|=1.

Figure 2:
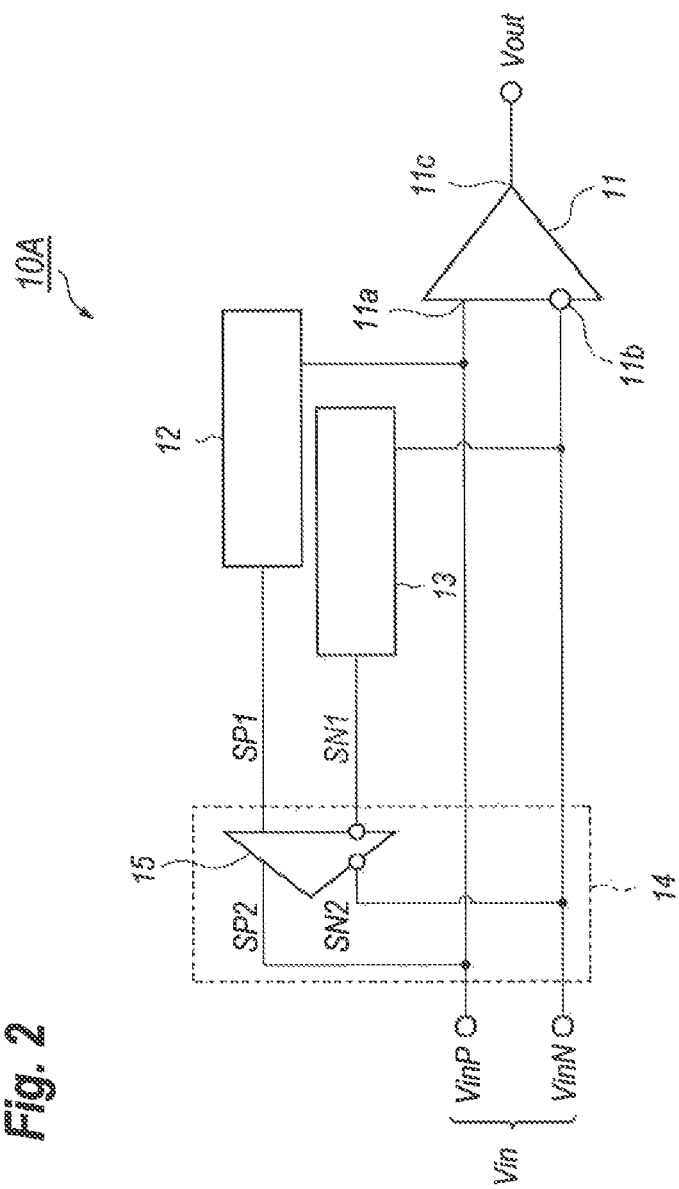
FIG. 2 is a schematic diagram of a driving circuit of one embodiment of the present application.

FIG. 2 is a schematic diagram of the driving circuit 10A of the first embodiment. The driving circuit 10A includes not only the linear differential amplifier 11 but also a first peak detector 12, a second peak detector 13, and a DC-level equalizer 14. The first peak detector 12 detects a peak level of the positive-phase signal VinP and outputs a first offset signal SP1 depending on the detected peak level of the positive-phase signal VinP. The second peak detector 13 detects a peak level of the negative-phase signal VinN and outputs a second offset signal SN1 depending on the detected peak level of the negative-phase signal VinN.

The DC-level equalizer 14 adds a first bias level to the positive-phase signal VinP, and a second bias level to the negative-phase signal VinN respectively, and adjusts the first and second bias levels depending on a difference between the first and second offset signals, SP1 and SN1, to equalize the respective peak levels of the positive-phase and negative-phase signals, VinP and VinN. The DC-level equalizer 14 includes a differential amplifier 15 (second differential amplifier) to amplify the difference between the first and second offset signals SP1, SN1. The DC-level equalizer 14 adjusts the first bias level of the positive-phase signal VinP by the first control signal SP2 output from the differential amplifier 15, and the second bias level of the negative-phase signal VinN by the second control signal SN2 also output from the differential amplifier 15. The DC-level equalizer 14 configures an adjusting circuit to adjust the first and second bias levels superposed on the positive-phase and negative-phase signals, respectively. The operating frequencies of the DC-level equalizer 14 is set to, for instance, hundreds of KHz or less, which is much lower than frequencies or a transmission speed of the differential input signal Vin, which is, for instance, 25 Gbps.

Figure 3:
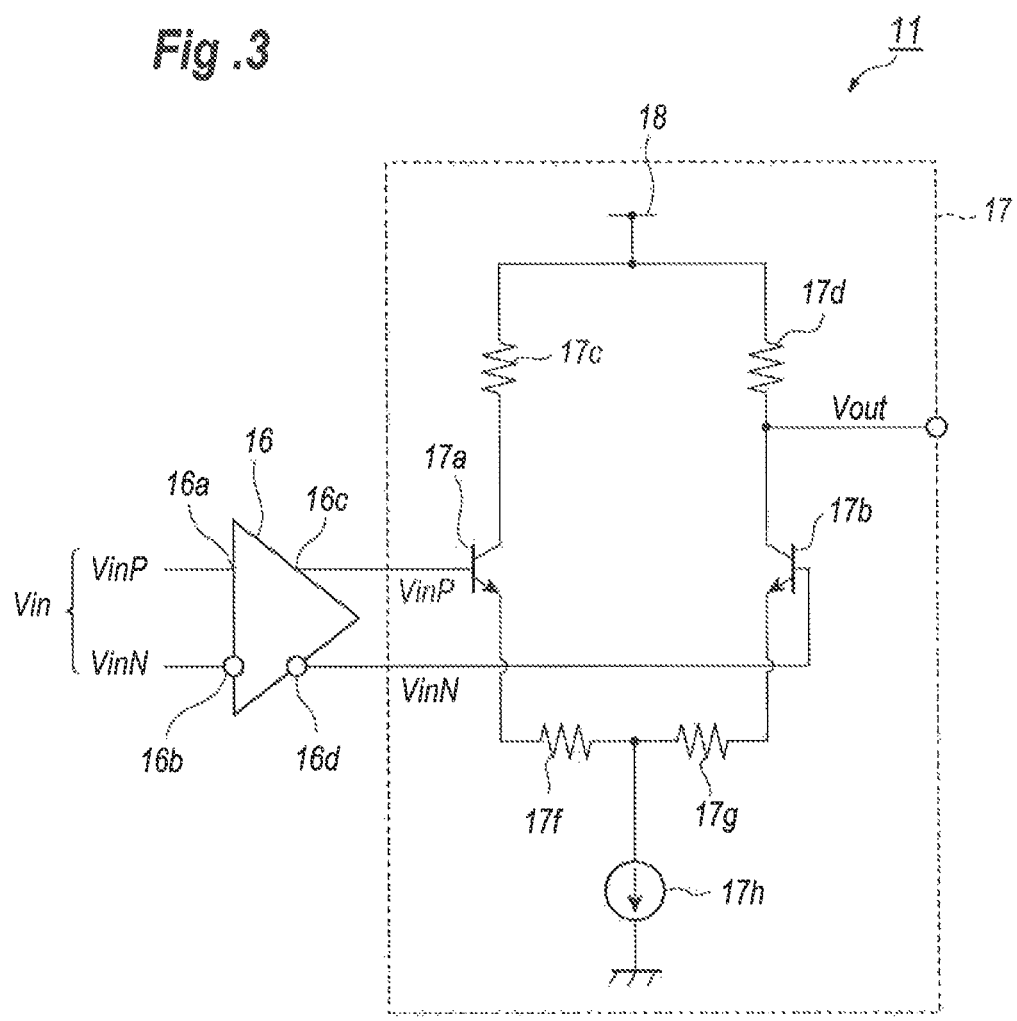
FIG. 3 is a circuit diagram of an example of the differential amplifier.

FIG. 3 is a circuit diagram of an example of the differential amplifier 11. The differential amplifier 11 includes a pre-amplifier 16 in an upstream and a main amplifier 17 in a downstream. The positive-phase and negative-phase signals, VinP and VinN, are input to a positive-phase input terminal 16a and a negative-phase input terminal 16b of the pre-amplifier part 16, respectively. The positive-phase output terminal 16c and negative-phase output terminal 16d output respective amplified signals of the positive-phase and negative-phase signals, VinP and VinN, The output amplitude of the pre-amplifier 16 is smaller by half to quarter of the main amplifier 17. Accordingly, the power consumption of the differential amplifier 11 becomes to dependent primarily on that of the main amplifier 17, because larger amplitude of an output signal generally results in the larger power consumption.

Before describing the main amplifier 17, basic operation and characteristics of a linear differential amplifier when a differential input signal with four logic levels, which is called as the PAM-4 signal, is input to the linear differential amplifier is described.

Figure 17A:
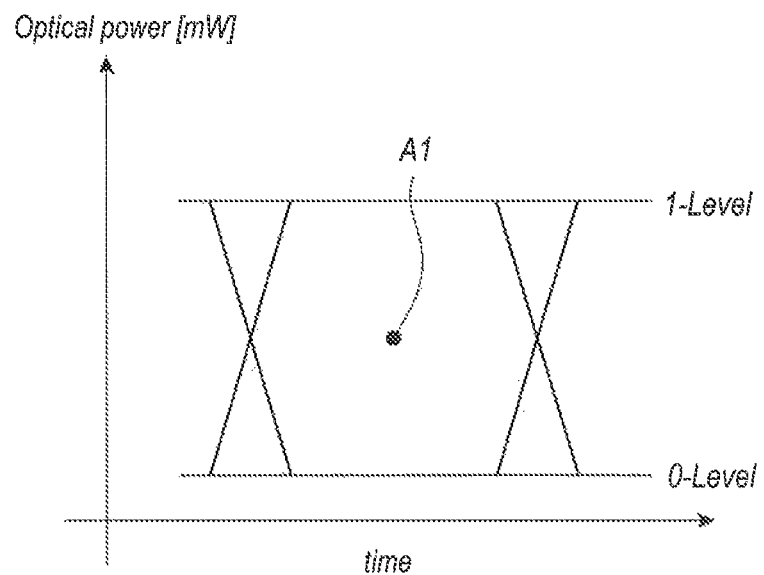
FIGS. 17A and 17B are eye patterns of a transmission signal, namely, one bit per symbol, in a conventional PAM-2 system and a transmission signal in a PAM-4 system, respectively.
Figure 17B:
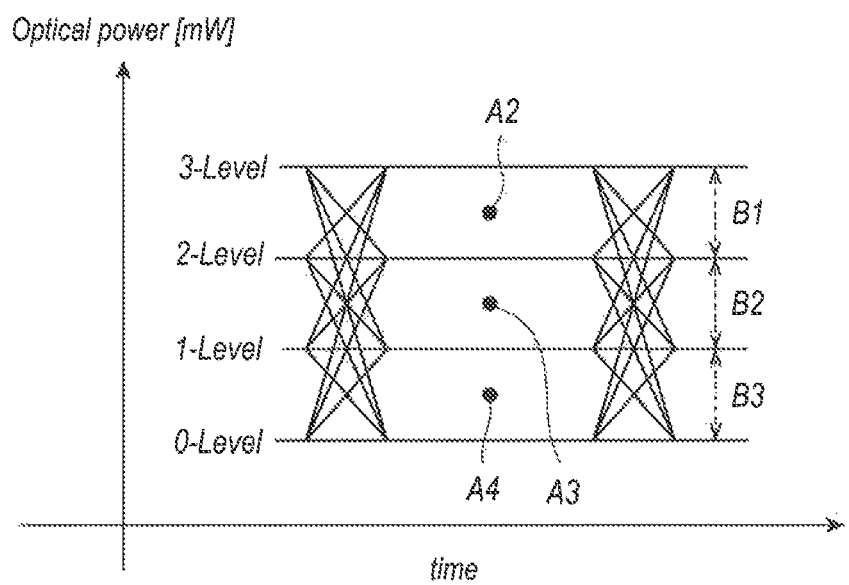

FIG. 17A is an example of eye patterns of a conventional PAM-2 signal transmitting one bit per symbol. Actually, the PAM-2 signal is deemed to be the same as the NRZ (Non-Return to Zero) signal. FIG. 17B is an example of eye patterns of a PAM-4 signal transmitting 2 bits per symbol, The horizontal axis corresponds to time and the vertical axis corresponds to the optical power in FIG. 17A and FIG. 17B. The points A1 to A4 indicate decision points. in FIG. 17A, the PAM-2 signal has only one decision point A1, because the assignable logic levels in the optical power are only two levels, 0-Level and 1-level. In FIG. 17B, the PAM-4 signal has three decision points A2 to A4, because the assignable logic levels in the optical power are four levels, 0-level to 3-Level.

In an optical signal transmission accompanied. with a distance of 80 Km. or less, for instance, noise involved in the optical reception signal becomes independent of the optical power of the optical reception signal. Therefore, the amplitudes between the two neighboring power levels, B1 to B3, of the PAM-4 signal are set to be equal to each other for reducing the error rate appearing in the optical reception system, because the decision point corresponding to a smaller amplitude results in a larger error rate than other decision points corresponding to larger amplitudes, when the is amplitudes B1 to B3 are unequal.

FIGS. 18A to 18O show a relationship between an EAM driving signal (an electrical input signal) and an optical output signal in the PAM-4 system. FIG. 18A is input-output characteristics (transfer characteristics) and the horizontal axis is driving voltage (unit; Volt) and the vertical axis is optical output power (unit: mW).

FIG. 18B is an example of eye patterns of the driving voltage signal input to the EAM. FIG. 18C is an example of eye patterns of the optical output signal output from the EAM. In FIG. 18C, the amplitudes between the two neighboring power levels among 0-level to 3-level are set to be substantially equal. However, in FIG. 18A, the EAM has nonlinear performance in the input-output characteristics. Accordingly, in FIG. 18B, the amplitudes B4 to B6 of the driving voltage signal should be set to be unequal to each other, The unequalness of the amplitudes B4 to B6 is due to the nonlinearity of input-output characteristics of the EAM. Other optical modulators except for the EAM also need a correction for the amplitudes B4 to B6 similar to those described above, when they show nonlinear input-output characteristics like the EAM. in addition, when the number of the logic levels is more than four, for instance, the PAM-8 (0-Level to 7-Level) system or the PAM-16 system (0-Level to 15-Level), the amplitudes of the two neighboring logic levels become unequal by the same reason.

Figure 19:
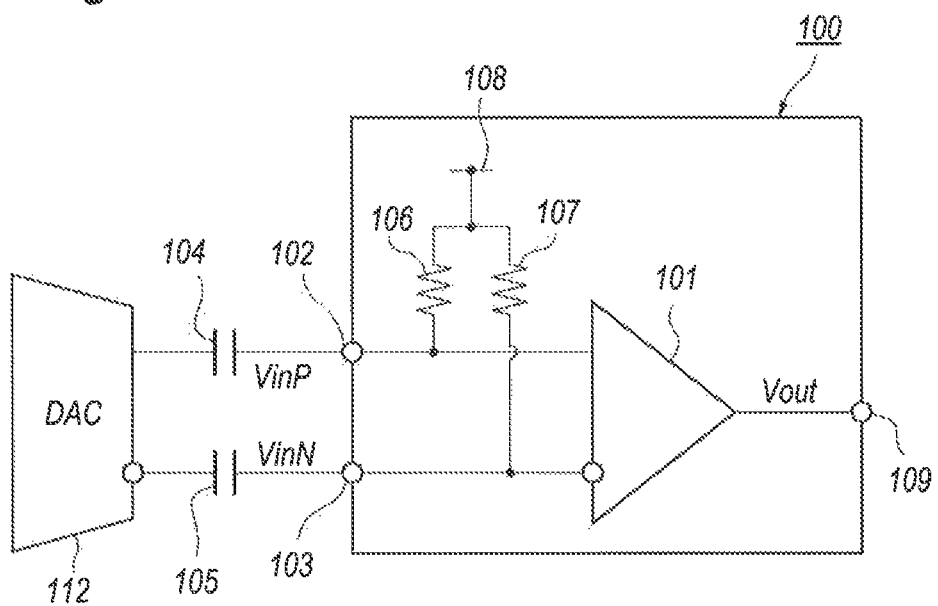
FIG. 19 is a schematic diagram of an example of a driving circuit for the EAM device.

FIG. 19 is a schematic diagram of an example of a driving circuit with a circuit in upstream. The driving circuit 100 comprises a differential amplifier 101 operating linearly, and terminals 102, 103, 109. The terminals 102, 103 are connected to the input terminals of the differential amplifier 101, and the terminal 109 is connected to the output terminal of the differential amplifier 101. The terminals 102, 103 are also connected with, for instance, a Digital-to-Analog Converter (DAC) 112 through coupling capacitors, 104 and 105. The positive-phase signal VinP a differential input signal is provided from the DAC 112 to the terminal 102. The negative-phase signal VinN of the differential input signal is provided from the DAC 112 to the terminal 103. When the driving circuit 100 is connected with the DAC 112 through, for instance, transmission lines with characteristic impedance of 50 Ohm, the wiring interconnecting the terminal 102 and the differential amplifier 101 is connected to a bias voltage line 108 through a resistor 106 with resistance of 50 Ohm, for instance, for matching the input impedance of the driving circuit with the characteristic impedance of the transmission line. In the same manner, the wiring interconnecting the terminal 103 and the differential amplifier 101 is connected to the bias voltage line 108 through another resistor 107 with resistance of 50 Ohm. Regarding the differential amplifier 101, the differential input signal Vin input to the differential amplifier 101 is expressed by the following formula (1) using the positive-phase signal VinP and the negative-phase signal VinN, $$Vin=VinP-VinN. \qquad (1)$$

FIG. 20A is a representative example of input-output characteristics (transfer characteristics) of the differential amplifier 101. The input-output characteristics include a linear region C1 and two saturated regions C2, C3. In the linear region C1, the driving signal Vout changes at a positive gradient with respect to the differential input signal Vin. In the saturated regions, C2 and C3, the driving signal Vout hardly changes against any change of the differential input signal Vin. For the linear amplification using the differential amplifier 101, only the linear region C1 is used to amplify the differential input signal Vin. The differential amplifier 100 outputs the amplified signal as the driving signal Vout. To prevent the differential input signal Vin from entering the saturated regions, C2 and C3, some margins called back-off voltages, VbackoffH and VbackoffL, are necessary. If the back-off voltages, VbackoffH and VbackoffL, are insufficient, the waveforms of the driving signal Vout will be deformed and output amplitudes, for instance, B1 and B2 in FIG. 18C, might collapse. FIG. 20E is an example of the eye-pattern of the PAM-4 signal amplified in the linear region C1 only. The amplitude Voutamp of the driving signal Vout is limited less than the voltage defined as Voutlimit−VbackoffH−Vbackoff, where Voutlimit is the maximum amplitude that the differential amplifier 101 may output. For instance, the maximum amplitude Voutlimit is 2.0 Vpp.

In the linear amplification described above, the differential input signal Vin from the DAC 112 is preferably amplified without distortion in order to generate a quality PAM-4 optical signal, in which the three amplitudes between two neighboring logic levels are the same. Accordingly, the back-off voltages, VbackoffH and VbackoffL, are needed to secure the amplitude Voutamp within the linear region C1 against any deviations and errors like, for instance, deviations in manufacturing, errors of circuit operations, temperature changes, fluctuation of supply voltages, and so on. The preferable back-off voltages, VbackoffH and VbackoffL, are for instance, 15% of the amplitude Voutamp.

However, when the differential input signal Vin attributed to the different inter-level amplitudes, B4 to B6, denoted in FIG. 18B is amplified, the back-off voltages, VbackoffH and VbackoffL, are different from each other. For instance, when the back-off voltage VbackoffL is set to be 15% of the amplitude Voutamp, the back-off voltage VbackoffH becomes 30%. The maximum voltage amplitude Voutlimit is necessary to be larger than a sum of the amplitude Voutamp and two back-off voltages, VbackoffH and VbackoffL. For instance, when both of the two back-off voltages, VbackoffH and VbackoffL, are 15%, the maximum voltage amplitude Voutlimit becomes 130%=100%+15%+15%. When the back-off voltage VbackoffH increases from 15% to 30%, the maximum voltage amplitude Voutlimit increases from 130% to 145%. The relative increase of 12% (=15%/130%) brings an increase of the power consumption of the output stage in the differential amplifier.

The reason why one of the back-off voltages, VbackoffH and VbackoffL, increases as described above is as follows. FIG. 22A is an eye pattern of the positive-phase signal VinP of the differential input signal, and FIG. 22B is an eye pattern of the negative-phase signal VinN of the differential input signal, and FIG. 22C is an eye pattern of the differential input signal Vin, and FIG. 22D is an eye pattern of the driving signal Vout, when the differential amplifier 101 amplifies the PAM-4 differential input signal with three different inter-level amplitudes between the two neighboring logic levels. Each eye patterns in FIG. 22A to FIG. 22D is drawn so that respective DC levels at no AC components are equal to each other. FIG. 22A and FIG. 22B show that the center level between the peak and bottom levels of the eye pattern deviates from the DC level, when the driving signal VinP has different inter-level amplitudes between two neighboring logic levels and respective frequencies of the logic levels are the same. The deviation, which is often called as an offset, arises in the circuit configuration. that the DAC 112 is connected with the terminals, 102 and 103 through the coupling capacitors, 104 and 105.

Specifically, as shown in FIG. 22A, the difference between the peak level of the positive-phase signal VinP and the DC level at no AC components is 21.25%, and the difference between the DC level and the bottom level of the positive-phase signal VinP is 28.75%, assuming that the amplitude Voutamp is 100%. Accordingly, the center level of the positive-phase signal VinP shifts toward the negative direction by 3.75% from the DC level. In the same manner, as shown in FIG. 22B, the difference between. the peak level of the negative-phase signal VinN and the DC level at no AC components is 28.75%, and the difference between the DC level and the bottom level of the negative-phase signal VinN is 21.25%, Accordingly, the center level of the negative-phase signal VinN shifts toward the positive direction by 3.75% from the DC level. Now, assuming that the linear differential amplifier has the unit gain, namely |Vinamp|=|Voutamp|=100%, as shown in FIG. 22C, the difference between the peak level of the differential input signal Vin and the DC level at no AC components is 42.5% and the difference between the DC level and the bottom level of the differential input signal Vin is 57.5%, so that the center level of the differential input signal Vin shifts in the negative direction by 7.5% from the DC level of the differential input signal Vin. As a result, as shown in FIG. 22D, the driving signal Vout shows the shift in the center level thereof toward the negative-direction from the center level of the maximum voltage amplitude Voutlimit. Therefore, when the back-off voltage VbackoffL is set to be 15% of the amplitude Voutamp, the back-off voltage VbackoffH is preferably increased to 30%. Under such a condition, the maximum voltage amplitude Voutlimit is preferably to be 145% or more of the amplitude Voutamp. Equivalently, if the maximum voltage amplitude Voutlimit is taken as 100%, the amplitude Voutamp become 69% (=100%/145%). The rest, 31% of the maximum voltage amplitude Voutlimit, does not contribute to the amplitude of the driving signal Vout but results in the increased power consumption of the differential amplifier. The embodiments of the present application provide the driving circuits capable of reducing such unnecessary power consumption.

Now referring back to the main amplifier 17 in FIG. 3, the main amplifier 17 includes a differential transistor pair comprising a pair of NPN-type transistors, 17a and 17b. The control terminal (base) of one of the transistors 17a receives the amplified signal of the positive-phase signal VinP output from the positive-phase output terminal 16c of the pre-amplifier 16. The control terminal (base) of another of the transistors 17b receives the amplified signal of the negative-phase signal VinN output from the negative-phase output terminal 16d of the pre-amplifier 16. Respective collectors of the transistors, 17a and 17b, are connected to the voltage line 18 through resistors, 17c and 17d. The resistance of the resistors, 17c and 17d is, for instance, 50 Ohm. The voltage Vcc of the voltage line 18 is, for instance, 3.3V. Respective emitters of the transistors, 17a and 17b, are commonly connected to a current source 17h through resistors, 17f and 17g. The current flowing in the current. source 17h is, for instance, 52 mA. The voltage of the collector of the transistor 17b is output as an output voltage (driving signal Vout) of the differential amplifier 11. The maximum voltage amplitude Voutlimit of the main amplifier part 17 is, for instance, 50 Ohm×52 mA=2.6 Vpp. When the back-off voltages, VbackoffH and VbackoffL, are set to 15% of the amplitude Voutamp, the amplitude Voutamp of the main amplifier 17 becomes 2.0 Vpp (=2.6 Vpp×100%/130%). Further, when a voltage gain of the differential amplifier 11 is unity, respective amplitudes of the positive-phase and negative-phase signals, VinP and VinN, become 1.0 Vpp. The center level of the driving signal Vout becomes 2.0V, which is calculated by 3.3V (the voltage Vcc)−1.3V (50% of the maximum voltage amplitude Voutlimit.) The transistors, 17a and 17b may be N-channel MOSFETs and or the like.

Figure 4:
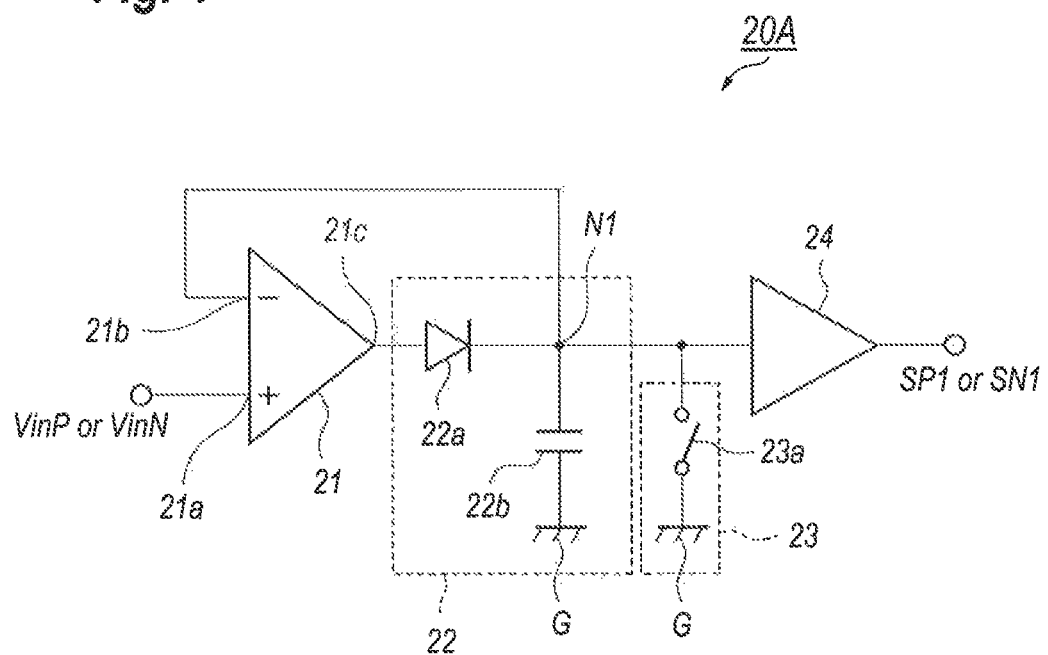
FIG. 4 is a circuit diagram of an example of the peak detector.

FIG. 4 is a circuit diagram of an example of the peak detector usable as the first peak detector 12 and the second peak detector 13 both appearing in FIG. 2. The peak detector 20A shown in FIG. 4 includes an operational amplifier 21, a hold circuit 22, a discharge circuit 23, and a buffer 24. The hold circuit 22 includes a diode 22a, a capacitor 22b, and a node N1 connected to a cathode of the diode 22a, one of two electrodes of the capacitor 22b, and an input terminal of the buffer 24. Another of the two electrodes of the capacitor 22b is grounded.

Figure 5A:
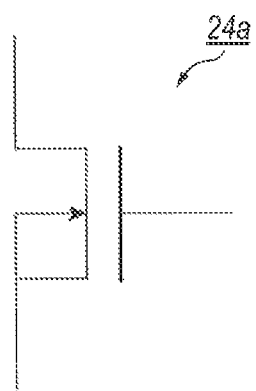
FIGS. 5A and 5E are examples of a switch device used in the discharge circuit.
Figure 5B:
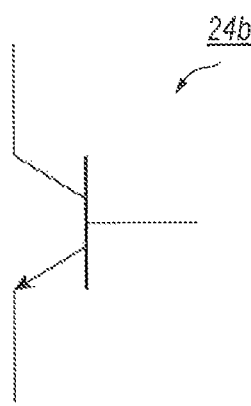

The non-inverting input terminal 21a of the operational amplifier 21 receives the positive-phase signal VinP when the peak detector 20A is used as the first peak detector 12, but receives the negative-phase signal VinN when the peak detector 20A is used as the second peak detector 13. The inverting input terminal 21b of the operational amplifier 21 is connected to the node N1 of the hold circuit 22 (duplicating records). The output terminal 21c of the operational amplifier 21 is connected to an anode of the diode 22a in the hold circuit 22. In the peak detector 20A, the node N1 holds a peak level of a voltage signal input to the non-inverting input terminal 21a. Accordingly, the node N1 holds a peak level of the positive-phase signal VinP or the negative-phase signal VinN. The level of the node N1 is output by the buffer 24, as the first offset signal SP1 or the second offset signal SN1. The discharge circuit 23 has, for instance, a switch device connected between the node N1 and the ground to discharge the capacitor 22b to reset the level of the node N1. In an alternative, an FET 24a shown in FIG. 5A or a bipolar transistor 24b shown in FIG. 5b are usable as the switch device. For instance, when a reset signal SR is input to the gate of the FET 24a or the base of the bipolar transistor 24b, the discharge circuit 23 discharges the capacitor 22b by setting a reset signal SR (SYMBOL SR is not found in the figures) in HIGH to turn on the FET 24a or the bipolar transistor 24b, and stops the discharging by setting the reset signal SR in LOW to turn off the FET 24a or the bipolar-transistor 24b. Not only the peak detector shown in FIG. 4 but also other kinds of peak detectors to perform the same function by the different configurations may be used as the first and second peak detectors, 12 and 13.

Figure 6:
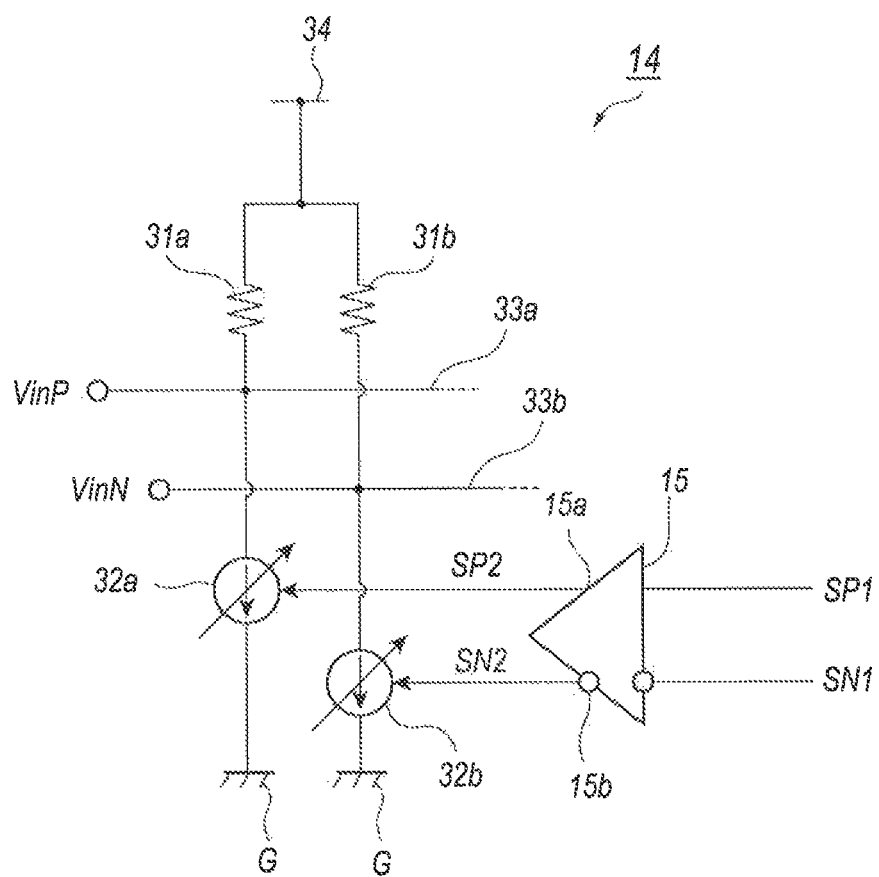
FIG. 6 is a circuit diagram of an example of the DC-level equalizer.

FIG. 6 is a circuit diagram of an example of the DC-level equalizer 14. The DC-level equalizer 14 includes a feedback differential amplifier 15, resistors, 31a and 31b, and current sources, 32a and 32b. A differential amplifier 11 may be used as the feedback differential amplifier 15. The resistors, 31a and 31b, are provided to match the input impedance of the driving circuit 10A with that of the signal lines carrying the respective input signals thereon. The resistor (first resistor) 31a has two terminals, one of which is connected to a positive-phase signal line to transmit the positive-phase signal VinP, and another of which is connected to a voltage line (bias voltage line) 34. The resistor (second resistor) 31b also has two terminals, one of which is connected to the negative-phase signal line to transmit the negative-phase signal VinN, and another of which is connected to the voltage line (bias voltage line) 34.

The resistance of respective resistors, 31a and 31b, is, for instance, 50 Ohm. The current source 32a is connected in series to the resistor 31a, and put between the resistor 31a and ground. The current source 32b is connected in series to the resistor 31b, and put between the resistor 31b and ground. The current flowing in the current source 32a is adjusted by the first control signal SP2 output from the non-inverting output terminal 15a of the feedback differential amplifier 15, The current flowing in the current source 32b is adjusted by the second control signal SN2 output from the inverting output terminal 15b of the feedback differential amplifier 15.

In the DC-level equalizer 14, when the voltage of the first control signal SP2 becomes larger, namely, the peak level of the positive-phase signal VinP becomes higher than the peak level of the negative-phase signal VinN, the current flowing in the current. source 32a increases. Also, the voltage of the second control signal SN2 concurrently becomes smaller, because the first and second offset signals, SP2 and SN2, are complementary to each other, which decreases the current flowing in the current source 32b. Accordingly, a voltage drop by the resistor 31a increases, which lowers the DC level (bias level) of the positive-phase signal VinP, and a voltage drop by the resistor 31b decreases, which increases the peak level of the negative-phase signal VinN. Accordingly, a difference between the respective peak levels of the positive-phase and negative-phase signals decreases. Voltage-controlled current sources are usable in the current sources, 32a and 32b.

Mechanisms to reduce the power consumption of the driving circuit 10A of the first embodiment described above will be explained. In the driving circuit 100 shown in FIG. 19, respective center levels between the peak and bottom levels of the positive-phase and negative-phase signals deviate from the respective DC levels without any driving signals. The reason is that the respective average levels of the positive-phase and negative-phase signals deviate from the respective center levels, because the amplitudes between two neighboring logic levels are different in each of the positive-phase and negative-phase signals, as described above. Accordingly, as shown in FIG. 22C, the differential input signal Vin has a difference of 42.5% between the peak level and the DC level and another difference of 57.5% between the DC level and the bottom level, where a difference of 100% corresponds to the amplitude of the differential input signal Vin, and this mean that the center level of the amplitude shifts towards the negative direction by 7.5% from the DC level E1. Therefore, as shown in FIG. 22D, the center level of the driving signal Vout shifts from the center level of the maximum amplitude of the signal output from the differential amplifier 101, and one of the two back-off voltages becomes larger than the other of the two back-off voltages requires a larger voltage as the maximum amplitude. In other words, a ratio of the amplitude of the driving signal Vout to the maximum voltage amplitude of the differential amplifier 101 decreases which results in the degradation of the power consumption.

Figure 7:
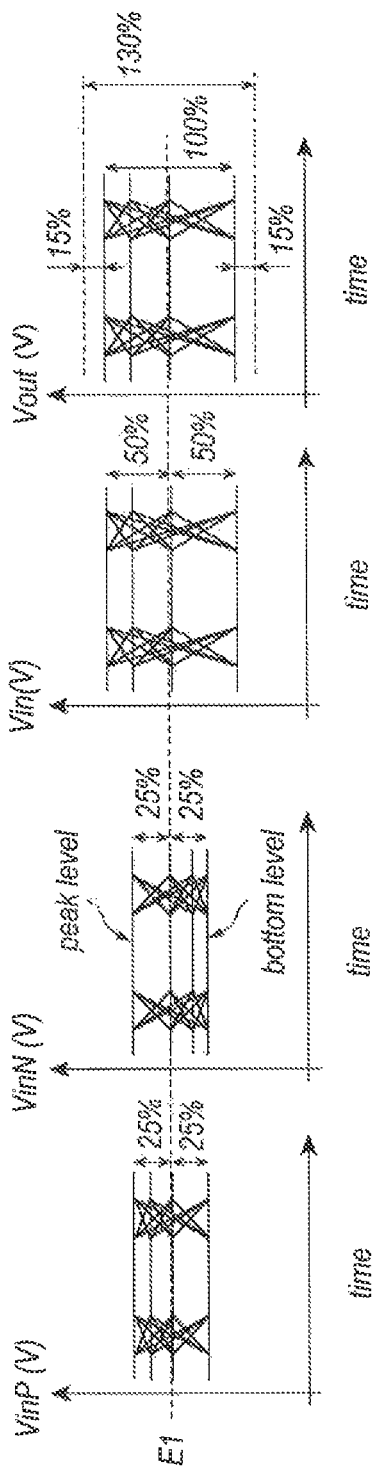
FIGS. 7A to 7D are examples of eye patterns of the positive-phase signal, the negative-phase signal, the differential input signal, and the driving signal shown in FIG. 2.

The driving circuit 10A of the first embodiment has the function to adjust respective DC levels of the positive-phase and negative-phase signals by the DC-level equalizer 14. By adjusting the DC levels, respective peak levels of the positive-phase and negative-phase signals become closer to each other, so that the respective offsets of the center levels of the positive-phase and negative-phase signals may be reduced as shown in FIG. 7A and FIG. 7B. Thus, the difference between the peak level and the DC level E1 and the difference between the DC level and the bottom level become close to 50% respectively, where a difference of 100% corresponds to the amplitude Vinamp of the differential input signal Vin, and the center level between the peak and bottom levels substantially coincides with the DC level E1 as shown in FIG. 7C. As a result, the center level between the peak and the bottom levels of the output signal Voutamp coincides with the center level of the maximum voltage amplitude Voutlimit, and the feedback operation by the DC-level equalizer 14 prevents the back-off voltages from being larger.

For instance, in FIG. 7D, the upper back-off voltage VbackoffH is reduced to 15% comparing with that in FIG. 22D. Therefore, the driving circuit 10A increases the ratio of the amplitude Voutamp against the maximum voltage amplitude Voutlimit, which means that the maximum voltage amplitude Voutlimit may be smaller than the amplitude Voutamp. Because the maximum voltage amplitude Voutlimit of the differential amplifier 11 is in proportion to the power consumption of the differential amplifier 11, the driving circuit 10A of the first embodiment may reduce the power consumption thereof.

In addition, the power consumption W of the output stage of the differential amplifier 11 (main amplifier 17) is represented by a product (Iee×Vcc) of a current Iee flowing in the current source 17h in FIG. 3 multiplied by a difference Vcc between the voltage line 18 and the ground. The voltage Vcc is determined by, for instance, a sum of the minimum voltage operable for the transistors, 17a and 17b, in the main amplifier 17, the minimum voltage operable for the current source 17h, and the maximum amplitude of the driving signal Vout. The current Iee is determined, for instance, based on the maximum voltage amplitude that the differential amplifier 11 is to output, and the resistance of the output resistors. Specifically, the power consumption W is represented by the formula of:

$$Iee=Voutllimit/(Rout//Ream),$$

where the symbol Voutlimit denotes the maximum voltage amplitude of the differential amplifier 11, and the symbol Rout denotes the resistance of the resistor 17, the symbol Ream denotes the resistance of a parallel circuit of the EAM 5 and the termination resistor 19, and the symbol denotes the resistance of a circuit including two resistors put in respective sides of this symbol and connected in parallel to the others. The resistance Rout and the resistance Ream are determined by the operational frequency band of the EAM 5 and the impedance matching with the characteristic impedance of the transmission line. For instance, when used in a transmission speed of 28 giga-bit per second (Gbps), the resistors, Rout and Ream, are set to he 50 Ohm, and the combined resistance (Rout//Ream) becomes 25 Ohm. In this way, the power consumption of the output stage in the differential amplifier is determined by the maximum voltage amplitude, which is a sum of the output amplitude and the back-off voltages, an operational voltage of transistors, and the resistance of the resistor for matching the output impedance.

In the first embodiment, the DC-level equalizer 14 may receive the first and second offset signals, SP1 and SN1, include a differential amplifier for outputting the first and second control signals, SP2 and SN2, amplitudes of which change according to a difference between the first and second offset signals, SP1 and SN1, and adjust respective DC levels of the positive-phase and negative-phase signals, VinP and VinN, by the first and second control signals, SP2 and SN2, respectively. Thus, the DC-level equalizer 14 may be preferably configured.

In the first embodiment, the driving circuit 10A may include the resistor 31a, which has two terminals, one of which is connected to the positive-phase signal line transmitting the positive-phase signal VinP, and the other of which is connected to the voltage line 34, and the resistor 31b also having two terminals, one of which is connected to the negative-phase signal line transmitting the negative-phase signal VinN, and the other of is connected to the voltage line 34. The DC-level equalizer 14 may include the current source 32a connected in series to the resistor 31a and another current source 32b connected in series to the resistor 31b. The DC-level equalizer 14 may adjust the current flowing in the current source 32a according to the first control signal SP2, and another current flowing in the current source 32b according to the second control signal SN2. Thus, the DC-level equalizer 14 may be preferably configured to suitably adjust the respective DC levels of the positive-phase and negative-phase signals, VinP and VinN.

In addition, in the first embodiment, the DC-level equalizer 14 may decrease the current flowing in the current source 32a and increase the current flowing in the current source 32b when the peak level of the positive-phase signal VinP is lower than the peak level of the negative-phase signal VinN, and increase the current flowing in the current source 32a and decrease the current flowing in the current source 32b when the peak level of the positive-phase signal VinP is higher than the peak level of the negative-phase signal VinN. Thus, the respective DC levels of the positive-phase and negative-phase signals, VinP and VinN, may be suitably adjusted.

In the first embodiment, the first peak detector 12, second peak detector 13, and the DC-level equalizer 14 are added to the driving circuit 100 shown in FIG. 19. Such additional circuits also consume the power. The negative feedback control using those additional circuits, however, operate in low frequencies, for instance, hundreds of kilo-hertz (kHz) or less, comparing with the operating frequencies or the modulation rate of the driving signal Vout. Accordingly, the increase of the power consumption due to those additional circuits may be much smaller than the reduction of the power consumption by the effect realized by the negative feedback operation described above. Thus, the driving circuit 10A in the first embodiment enables to reduce the total power consumption thereof.

First Modification

Figure 8:
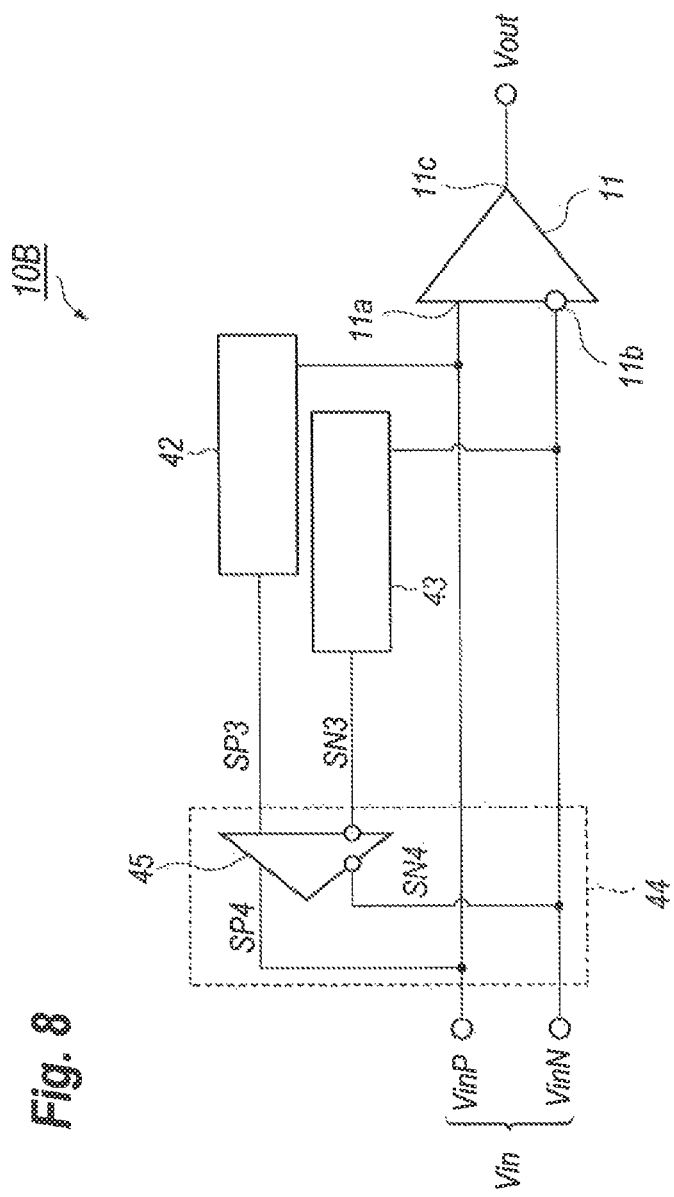
FIG. 8 is a schematic diagram of a driving circuit of another embodiment of the present application.

FIG. 8 is a schematic diagram of a driving circuit of a modification of the aforementioned embodiment. As shown in FIG. 8, the driving circuit 10B includes a first bottom detector 42 instead of the first peak detector 12, a second bottom detector 43 instead of the second peak detector 13, and the DC-level equalizer 44.

Figure 9:
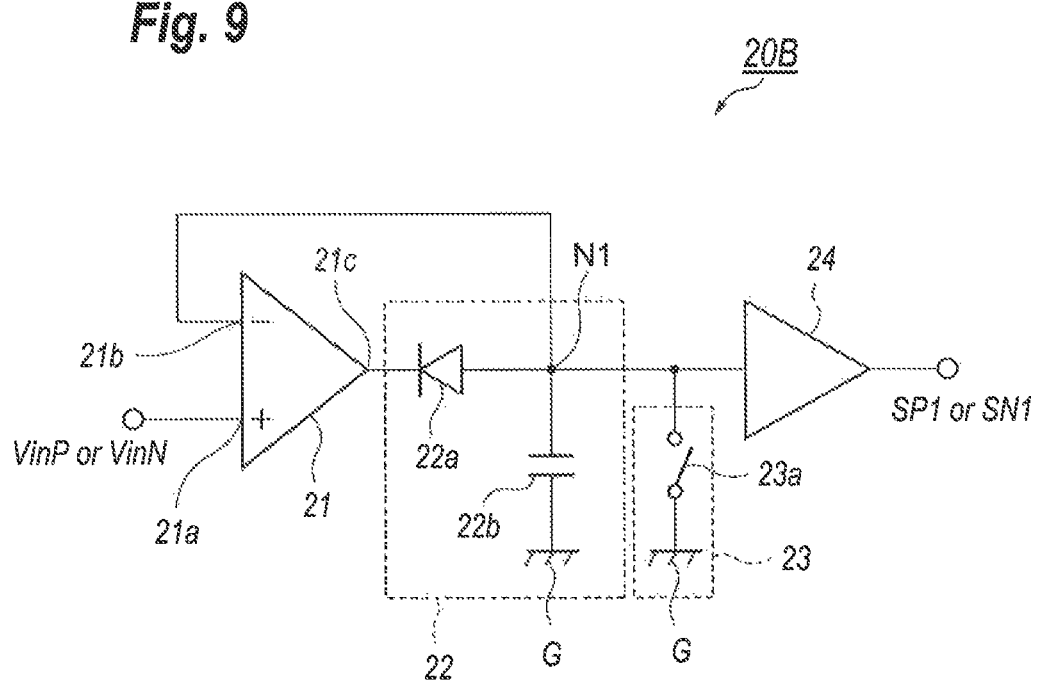
FIG. 9 is a circuit diagram of an example of the bottom detector.

The first bottom detector 42 detects a bottom level of the positive-phase signal VinP and outputs a first offset signal SP3 depending on the detected bottom level of the positive-phase signal VinP. The second bottom detector 43 detects a bottom level of the negative-phase signal VinN and outputs a second offset signal SN3 depending on the detected bottom level of the negative-phase signal VinN. FIG. 9 is a circuit diagram of an example of the preferable bottom detector usable for the first and second bottom detectors, 42 and 43. The bottom detector 20B shown in FIG. 9 has the same configuration as the peak detector 20A shown in FIG. 4 with respect to the operational amplifier 21, the hold circuit 22, the discharge circuit 23, and the buffer 24, but except for the diode 22a. In the bottom detector 20B, the direction of the diode 22a is reversed from that of the peak detector 20A. Specifically, the node N1 is connected to the anode of the diode 22a and the output terminal 21c of the operational amplifier 21 is connected to the cathode of the diode 22a. In the configuration, the node N1 holds a bottom level of the positive-phase signal VinP or the negative-phase signal VinN. The level of the node N1 is output as the first offset signal SP3 or the second offset signal SN3 through the buffer 24. Not only the bottom detector shown in FIG. 9 but also other types of the bottom detector circuits to perform the same function with the different circuit configurations may be used as the first and second bottom detectors 42, 43.

Referring back to FIG. 8, the DC-level equalizer 44 adjusts respective DC levels of the positive-phase and negative-phase signals, VinP and VinN, according to a difference between the first and second offset signals, SP3 and SN3, so that respective bottom levels of the positive-phase and negative-phase signals, VinP and VinN, may be closer to each other. The DC-level equalizer 44 of the present modification includes a differential amplifier 45 (second differential amplifier) to amplify a difference between the first and second offset signals, SP3 and SN3 The DC-level equalizer 44 adjusts the DC level of the positive-phase signal VinP by a first control signal SP4 output from the differential amplifier 45, and the DC level of the negative-phase signal VinN by a second control signal SN4 output from the differential amplifier 45, respectively. Further, the DC-level equalizer 44 of the present modification configures an adjusting circuit to adjust respective DC levels of the positive-phase and negative-phase signals, VinP and VinN. Details of the DC-level equalizer 44 may be configured in the same manner with those of the DC-level equalizer 14.

In the present modification of the first embodiment, the DC-level equalizer 44 is able to adjust respective DC levels of the positive-phase and negative-phase signals, VinP and VinN, so that respective bottom levels of the positive-phase and negative phase signals, VinP and VinN, become closer. As a result, such an adjustment may reduce a difference (offset) between respective center levels of the positive-phase and negative-phase signals, VinP and VinN. Therefore, in the same manner with the first embodiment above, the present modification may prevent the back-off voltages from increasing and improve the ratio of the amplitude of the driving signal Vout against the maximum voltage amplitude of the differential amplifier 11. The improved ratio results in the reduction of the power consumption.

In addition, similar to the first embodiment, the respective DC levels (bias levels) of the positive-phase and negative-phase signals, VinP and VinN, are adjustable according to the bottom levels each derived from the positive-phase and negative-phase signals, VinP and VinN. In such a way, the respective DC levels of the positive-phase and negative-phase signals, VinP and VinN, are preferably adjusted. The same types of adjustment may be possible by embodiments and modifications thereof described below.

(Second Modification)

Figure 10:
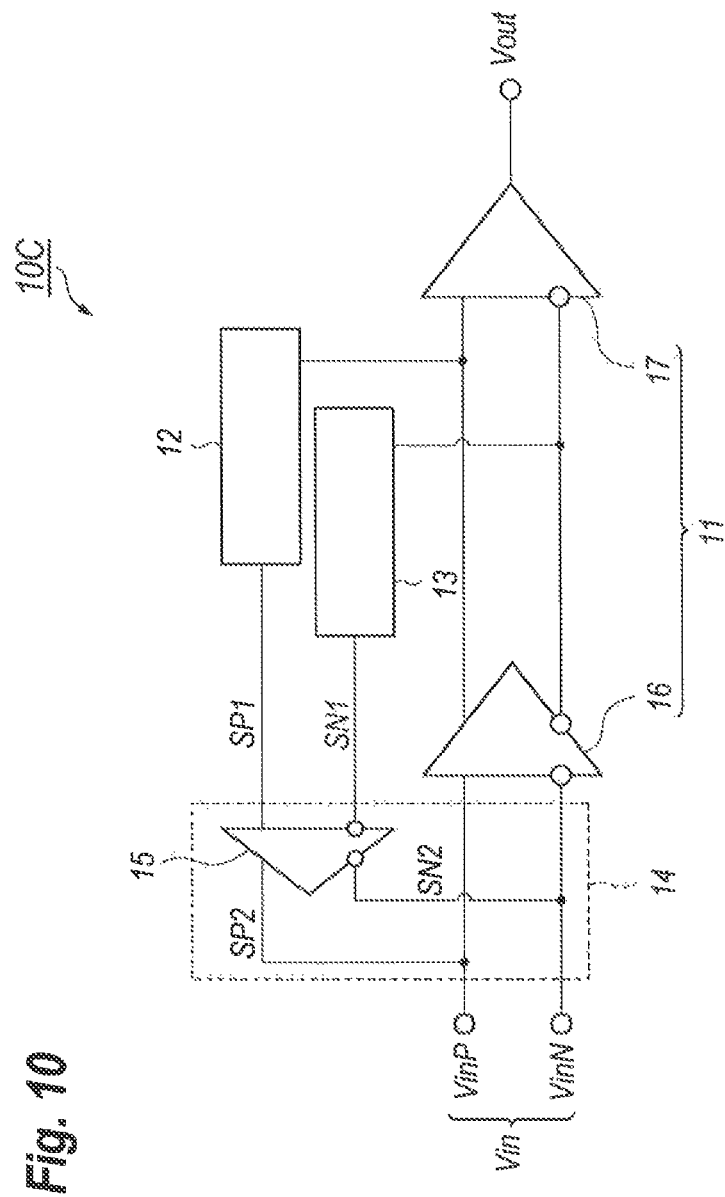
FIG. 10 is a schematic diagram of a driving circuit of a second embodiment of the present application.

FIG. 10 is a schematic diagram of a driving circuit of the second modification of the first embodiment. As shown in FIG. 10, in the driving circuit 10C of the second modification, the first and second peak detectors, 12 and 13, receive respective positive-phase and negative-phase signals, VinP and VinN, of the amplified differential input signal output from the pre-amplifier 16 whose arrangement is shown in FIG. 3. Further, the DC-level equalizer 14 adjusts respective DC levels of the positive-phase and negative-phase signals, VinP and VinN, of the differential input signal Vin input to the pre-amplifier 16. In the present modification, the main amplifier 17 corresponds to the first differential amplifier of the first embodiment, and the pre 16 is considered as the third differential amplifier. The configuration of the second modification may preferably produce the same function with the driving circuit 10A of the first embodiment.

(Third Modification)

Figure 11:
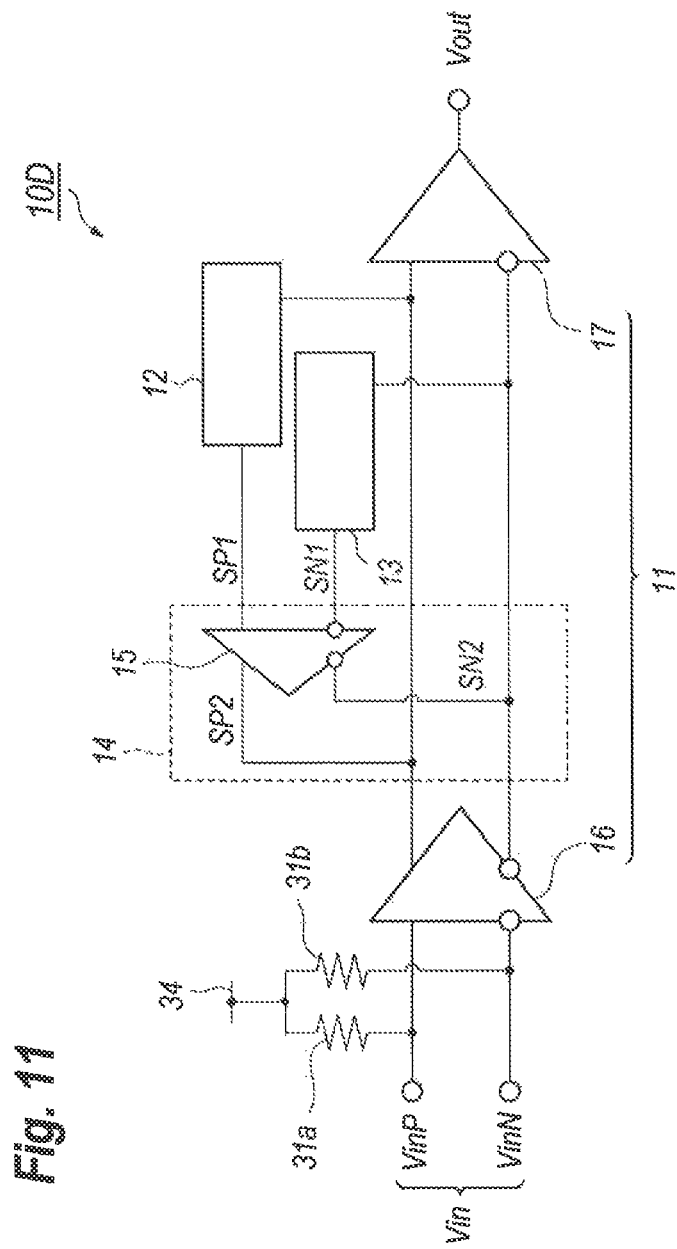
FIG. 11 is a schematic diagram of a driving circuit of a third embodiment of the present application.

FIG. 11 is a schematic diagram of a driving circuit 10D of the third modification of the present application. AS shown in FIG. 11, the first and second peak detectors, 12 and 13, in the driving circuit 10D receive respective positive-phase and negative-phase signals, VinP and VinN, of the amplified differential input signal output from the pre-amplifier 16, in the same manner with the second modification. A feature of the third modification distinguishable from the second modification, the DC-level equalizer 14 adjusts respective DC levels of the positive-phase and negative-phase signals, VinP and VinN, of the amplified differential signal output from the pre-amplifier 16 and input to the main-amplifier 17. The configuration of the third modification may preferably show the same function with the driving circuit 10A of the first embodiment.

(Fourth Modification)

Figure 12:
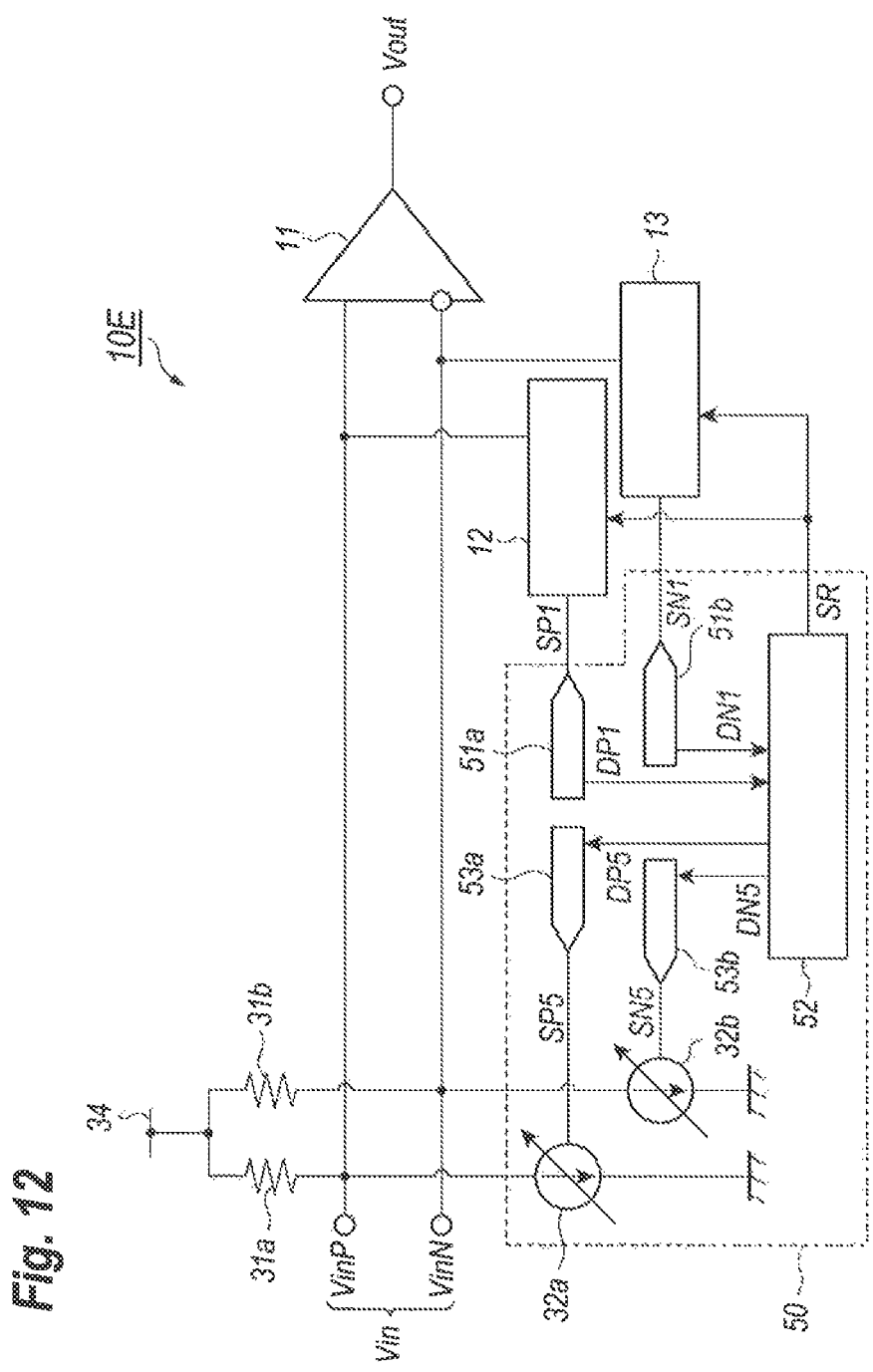
FIG. 12 is a schematic diagram of a driving circuit of a fourth embodiment of the present application.

FIG. 12 is a schematic diagram of a driving circuit 10E of the fourth modification of the present application. As shown in FIG. 12, the driving circuit 10E of the fourth modification includes a DC-level equalizer 50 instead of the DC-level equalizer 14. The DC-level equalizer 50 includes a first Analog-to-Digital Converter (ADC) 51a, a second ADC 51b, a control circuit 52, a first Digital-to-Analog Converter (DAC) 53a, and a second DAC 53b.

The first ADC 51a corverts the first offset signal SP1 output from the first peak detector 12 into a digital signal by the analog-to-digital conversion (A/D conversion). The second ADC 51b converts the second offset signal SN1 output from the second peak detector 13 into another digital signal by the A/D conversion. The control circuit 52 generates a first control signal DP5 to adjust a DC level (bias level) of the positive-phase signal VinP according to the first offset signal SP1 after the A/D conversion. Also, the control circuit 52 generates a second control signal DN5 to adjust a DC level (bias level) of the negative-phase signal VinN according to the second offset signal SN1 after the AID conversion. The first DAC 53a converts the first control signal DP5 into a first control signal SP5 by the digital-to-analog conversion (D/A conversion). The second DAC 53b converts the second control signal SN5 into a second control signal SN5 by the D/A conversion.

The configuration to adjust respective DC levels of the positive-phase and negative-phase signals, VinP and VinN, by the first and second control signals, SP5 and SN5, may be the same as those described above. In addition, the sampling frequency of the first and second ADCs, 51a and 51b, and that of the first and second DACs, 53a and 53b are set to be, for instance, dozens of kilo-hertz (kHz) to hundreds of kilo-hertz (kHz). The control circuit 52 may be implemented with a general purpose CPU.

In the fourth modification, the DC-level equalizer configured with the digital circuits like those described above may preferably show the same function with the driving circuit 10A of the first embodiment. In addition, the control circuit 52 may provide a reset signal SR to the first and second peak detectors, 12 and 13. The reset signal SR may be used to switch on/off the switch device 23a in the discharge circuit 23 (refer to FIG. 4) in the first and second peak detectors, 12 and 13.

(Fifth Modification)

Figure 13:
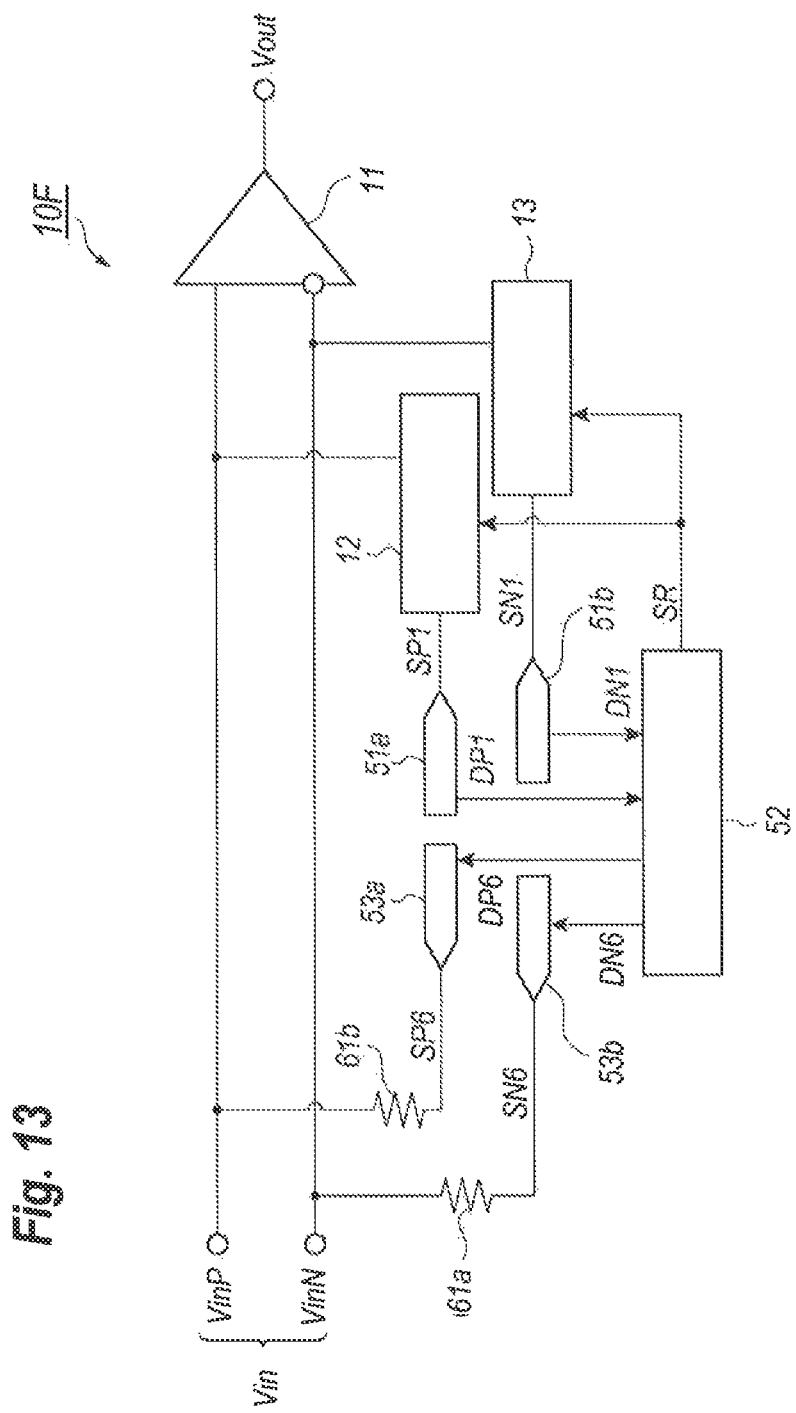
FIG. 13 is a schematic diagram of a driving circuit of a fifth embodiment of the present application.

FIG. 13 is a schematic diagram of a driving circuit of the fifth modification of the present application. As shown in FIG. 13, the driving circuit 10F in the fifth embodiment includes the resistors, 61a and. 61b, instead of the resistors, 31a and 31b, and the current sources, 32a and 32b, in the fourth embodiment. in the fifth embodiment, the control circuit 52 generates the first control signal DP6 to adjust the DC level (bias level) of the positive-phase signal VinP according to the first offset signal DP1. Also, the control circuit 52 generates the second control signal DN6 to adjust the DC level (bias level) of the negative-phase signal VinN according to the second offset signal DN1. The first DAC 53a converts the first control signal DP6 output from the control circuit 52 into the first. bias voltage VP6. In the same manner, the second DAC 53b converts the second control signal DN6 output from the control circuit 52 into the second bias voltage VN6. These bias voltages, VP6 and VN6, are applied to one end of the resistor 61a, one end of the resistor 61b, respectively. The other ends of the respective resistors, 61a and 61b, are connected to the positive-phase and the negative-phase signal lines, 33a and 33b, respectively.

In the fifth modification, by adjusting the respective bias voltages, VP6 and VN6, of the positive-phase and negative-phase signals, VinP and VinN, respective peak levels of the positive-phase and negative-phase signals, VinP and VinN, approaches to each other. Accordingly, a difference between the respective center levels of the positive-phase and negative-phase signals, VinP and VinN, may be decreased. Thus, the fifth modification of the driver circuit 10F may prevent the back-off voltages from increasing and enhance the contribution of the amplitude of the driving signal Vout in the maximum voltage amplitude of the differential amplifier 11, which results in the reduction of the power consumption. In addition, in the fifth modification, voltage followers may be inserted between the first DAC 53a and the resistor 51a, and between the second DAC 53b and the resistor 61b. Also, the control circuit 52 may provide a reset signal SR to the first and second peak detectors, 12 and 13. The reset. signal. SR may switch on/off the switch device 23a in the discharge circuit 23 (refer to FIG. 4) in the positive-phase and negative-phase peak detectors, 12 and 13.

(Sixth Modification)

Figure 14:
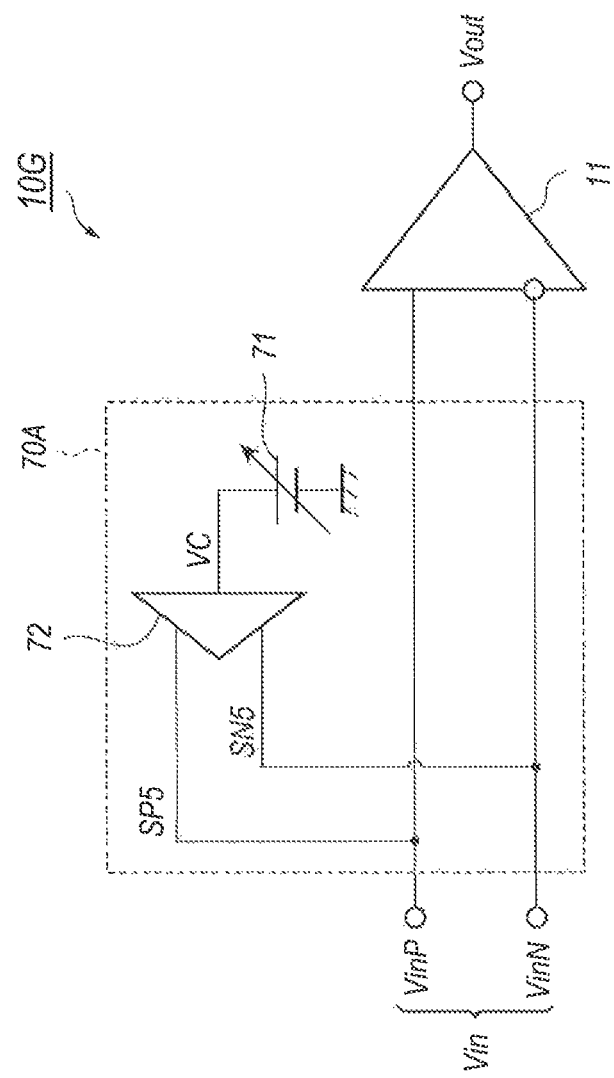
FIG. 14 is a schematic diagram of a driving circuit of a sixth embodiment of the present application.

FIG. 14 is a schematic diagram of a driving circuit 10G of the sixth modification of the present application, As shown in FIG. 14, the driving circuit 10G includes a DC-level equalizer 70A instead of the first and second peak detectors, 12 and 13, and the DC-level equalizer 14 in the aforementioned embodiments. The DC-level equalizer 70A includes a voltage source 71 and a DC-level setting circuit 72, The output voltage VC of the voltage source 71, which may be set optionally, is input to the DC-level setting circuit 72. The is DC-level setting circuit 72 generates the first control signal SP5 and the second control signal SN5 depending on the output voltage VC. The DC-level equalizer 70A adjusts the DC level of the positive-phase signal VinP by the first control signal SP5, and simultaneously adjusts the DC level of the negative-phase signal VinN by the second control signal SN5. The configuration to adjust respective DC levels of the positive-phase and negative-phase signals, VinP and VinN, by the first and second control signals, SP5 and SN5, may be same with those described in the aforementioned embodiments.

In the sixth modification, the DC-level equalizer 70A may adjust the respective DC levels of the positive-phase and negative-phase signals, VinP and VinN. By adjusting the control signals, SP5 and SN5, the respective peak levels of the positive-phase and negative-phase signals, VinP and VinN, approaches to each other. Accordingly, a difference (offset) between the respective, center levels of the positive-phase and negative-phase signals, VinP and VinN, may be reduced. Thus, the sixth modification may prevent the back-off voltages from increasing and enhance the contribution of the amplitude of the driving signal Vout in the maximum voltage amplitude of the differential amplifier 11 which results in the reduction of the power consumption. The sixth modification may be usable, for instance, when the respective center levels of the positive-phase and negative-phase signals are substantially constant, and the inter-level amplitudes between the two neighboring logic levels are determined based on the nonlinear relationship between the driving signal and the optical output power of EAM.

(Seventh Modification)

Figure 15:
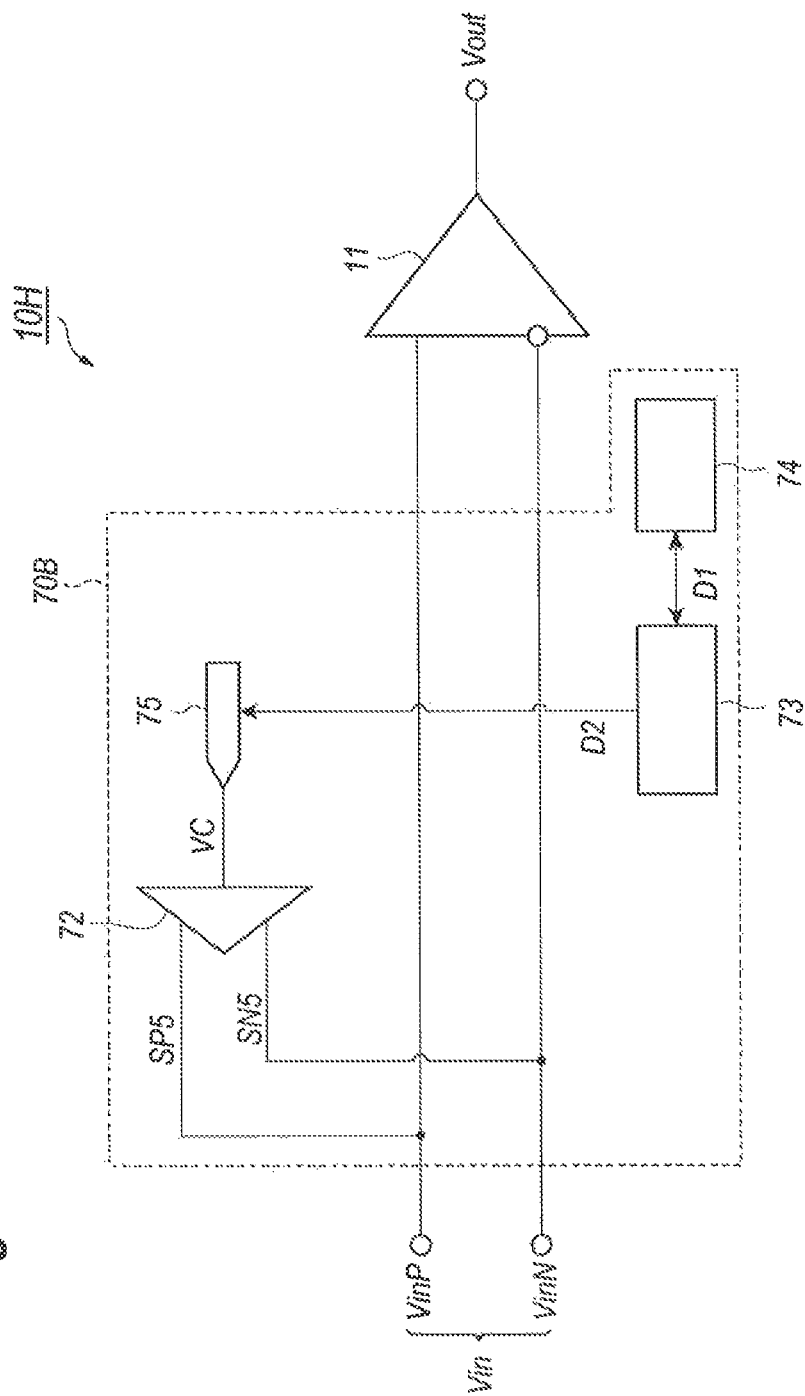
FIG. 15 is a schematic diagram of a driving circuit of a seventh embodiment of the present application.

FIG. 15 is a schematic diagram of a driving circuit of the seventh modification of the present application. As shown in FIG. 15, the driving circuit 10H includes the DC-level equalizer 70B instead of the first and second peak detectors, 12 and 13, and the DC-level equalizer 14 in the aforementioned embodiments. The DC-level equalizer 70B includes a DC-level setting circuit 72, a control circuit 73, a memory 74, and a DAC 75. The control circuit 73 generates a digital signal D2 corresponding to the voltage VC input to the DC-level setting circuit 72 based on a data D1 stored in the memory 74. The digital data D2 is converted into the voltage VC by the DAC 75. The data D1 stored in the memory 74 may be set optionally. The configurations of the DC-level equalizer 70B except the configuration described above are same with those of the DC-level equalizer 70A of the sixth modification.

In the seventh modification, the DC-level equalizer 70B may adjust respective DC levels (bias levels) of the positive-phase and negative-phase signals, VinP and VinN. The configuration of the seventh modification may effectively show the same function with those achieved by the sixth modification. in addition, in the seventh modification, the memory 74 may be included in the control circuit 73. Further, the seventh modification may compensate a temperature dependence of the DC levels by detecting an ambient temperature Ta by a temperature sensor (unillustrated in FIG. 15, but may be included in the control circuit 73) and reading the data Dl from a look-up table stored in the memory 74 according to the detected temperature.

(Eighth Modification)

Figure 16:
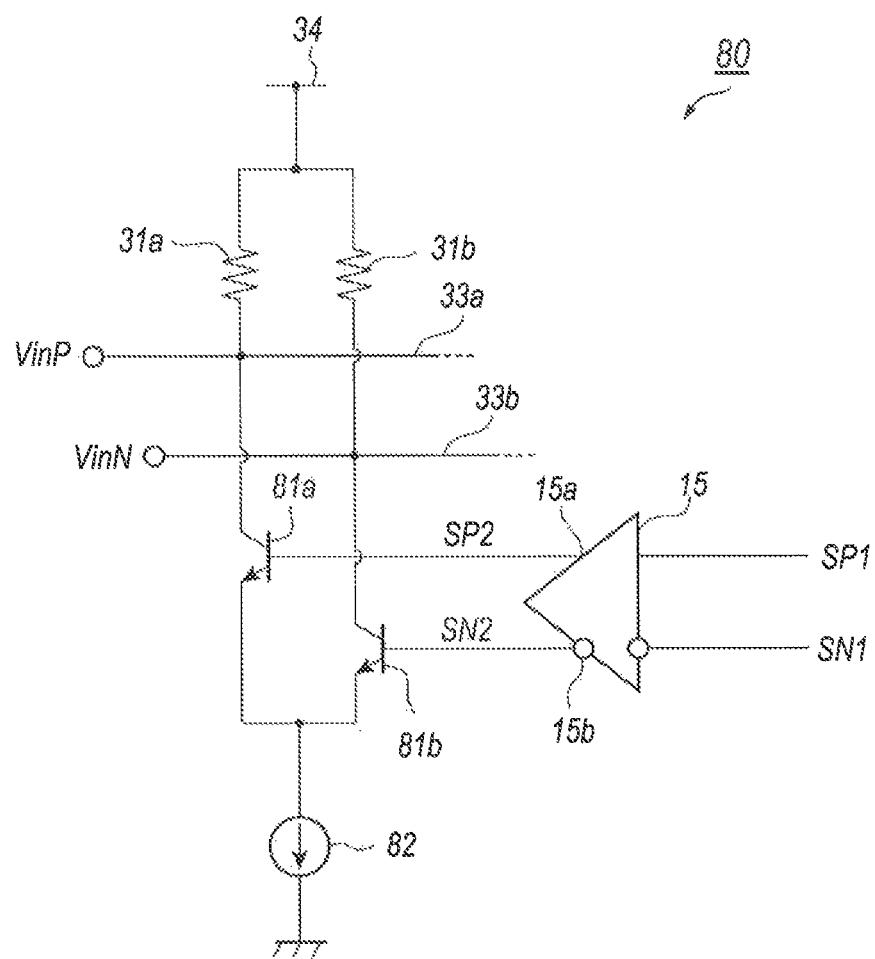
FIG. 16 is a circuit diagram of another example of the DC-level equalizer.

FIG. 16 is a circuit diagram of the differential equalizer 80 of the eighth modification. The DC-level equalizer in the eighth modification includes a pair of transistors, 81a and 81b, and a constant current source 82 instead of the current sources, 32a and 32b, of the DC-level equalizer 14 shown in FIG. 6. The control terminal (base) of the transistor 81a receives the first control signal SP2 from the differential amplifier 15. One of the current terminals (for instance, collector) of the transistor 81a is connected to the resistor 31a, and the other of the current terminals (for instance, emitter) of the transistor 81a is connected to the constant current source 82. The base of the transistor 81b receives the second control signal SN2 from the differential amplifier 15. The collector of the transistor 81b is connected to the resistor 31b, and the emitter of the transistor 81b is connected to the constant current source 82. The current flowing in the constant current source 82 is, for instance, 2 mA.

In the DC-level equalizer 80, when a difference between the first and second control signals SP2, SN2 increases, that is, the difference between the peak levels of the respective signals, VinP and VinN becomes large, the current flowing in the transistor 81a increases and the current flowing in the transistor 81b decreases. Accordingly, the DC level (bias level) of the positive-phase signal VinP falls down because a voltage drop by the resistor 31a increases, but the DC level (bias level) of the negative-phase signal VinN rises up because a voltage drop by the resistor 31b decreases. Therefore, the difference between the respective peak levels of the positive-phase and negative-phase signals, VinP and VinN, reduces, and ultimately becomes substantially zero. When the current flowing in the constant current source 82 is 3 mA and the resistance of the resisters, 31a and 31b is 50 Ohm, an adjustable range of the DC level (bias level) for two signals, VinP and VinN is 50 Ohm×3 mA=0.15V, which is 7.5% of the maximum voltage amplitude Voutlimit of the driving voltage signal Vout. The voltage of the constant voltage line 34 is, for instance, (2+0.075) V. The adjustable range of 0.15 V described above means that, when the optimum bias levels of the positive-phase and negative-phase signals, VinP and VinN, are set to be 2.0 V without the negative feedback by the transistors 81a, 81b, and the current source 82; a half of the adjustable range, 0.075 V is added to the optimum bias level 2.0V.

Further, when no pulses are superposed on the differential input signal Vin, respective currents flowing in the resistors, 31a and 31b, are equalized to each other so that respective DC levels of the positive-phase and negative-phase signals become the optimum bias levels, namely, VinP=VinN=2.0V. Then, inputting the differential input signal Vin containing four logic levels and assuming that the DC-level equalizer 14 does not perform the feedback operation, the center level of the positive-phase signal VinP lowers by 3.75% from the optimum center level of 2.0V and that of the negative-phase signal VinN rises by 3.75% from the optimum center level of 2.0V. Thus, an offset of 7.5% appears in the driving voltage signal Vout, as shown in FIG. 22. For such an operation, the currents of 1.5 mA flow in the resistors, 31a and 31b. Such an operation is available by resetting the positive-phase and negative-phase peak detectors by setting the reset signal SR to High-level. On the other hand, when the reset signal SR is set to the Low-level and the feedback operation by the DC-level equalizer 14 is activated, respective DC levels (bias levels) of the positive-phase and negative-phase signals, VinP and VinN, are adjusted so that the respective center levels of the positive-phase and negative-phase signals, VinP and VinN, become substantially equal to the optimum bias level 2.0 V (refer to FIG. 7). In such an operation, a current of 3 mA flows in the resistor 31a, and no current flows in the resistor 31b. The current flowing in the constant current source 82 may be increased to obtain a wider adjusting range.

The DC-level equalizer may include configurations like the embodiment. The configuration of the eighth modification may preferably produce the same effect with the embodiment described above.

Figures 23A, 23B:
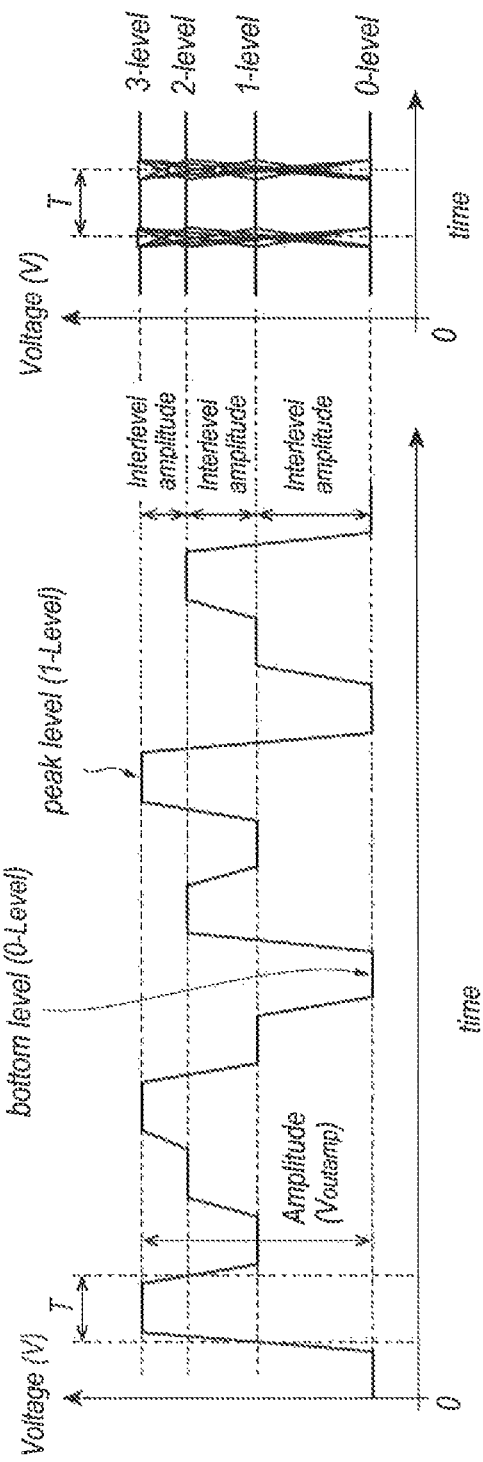
FIGS. 23A and 23B show examples of voltage waveforms of a transmission signal and an eve-pattern of a transmission signal in the PAM-4 system, respectively.

Although the embodiments of the present application are described above, an explanation about the voltage waveforms is added. FIG. 23A is an example of voltage waveforms of the PAM-4 signal, FIG. 23B is an example of an eye-pattern of a PAM-4 signal. The eye pattern shown in FIG. 23B corresponds to the waveform shown in FIG. 23A, which indicates consecutive transitions from one to one of the other of the logic levels (0-level to 3-level) in a PAM-4 signal. The peak level of the voltage waveform in FIG. 23A corresponds to the 3-level of the eye pattern in FIG. 23B. Similarly, the bottom level corresponds to the 0-level.

Accordingly, the peak levels in the embodiments described above are not a maximum appearing at a certain instant but a level stably and repeatedly appearing as the highest one, namely 3-level, in the logic levels of the PAM-4 transmission signal. Similarly, the bottom levels in the embodiments described above are not a minimum appearing at a certain instant but a level stably and repeatedly appearing as the lowest one, namely 0-level, of the logic levels of the PAM-4 transmission signal. Further, even in the PAM signal attributed to more logic levels, for instance, the PAM-8 (0-level to 7-level) or the PAM-16 (0-level to 15-level), the peak level and the bottom level correspond to respective levels repeatedly appearing in the signal. Accordingly, the embodiments described above configure to adjust respective DC levels (bias levels) of the positive-phase and negative-phase signals so that respective peak levels (or bottom levels) becomes equal to each other, but the invention is not limited to the PAM-4. The invention may be applicable to the PAM-0, PAM-16, and other PAM signals attributed to more logic levels.

While particular embodiments of the present invention have been described herein for purposes of illustration, many modifications and changes will become apparent to those skilled in the art. For instance, as the configuration of the DC-level equalizer to adjust respective DC levels of the positive-phase and negative-phase signals, VinP and VinN, various configurations other than the embodiment described above may be applied. Further, in the embodiments and their modifications described above, a peak level and a bottom level are used as the DC level that the positive-phase and negative-phase level detectors detects, but other DC levels except for the peak levels may be unlimitedly selected for the same purpose. In addition, other optical modulators attributed to the nonlinear input-output characteristics (transfer characteristics) except the Electro-Absorption modulator may be adopted to the embodiments and their modifications of the present application. Accordingly, the claims are intended to encompass all such modifications and changes as fall within the true spirit and scope of this invention.

What is claimed is:

1. A driving circuit to drive an optical modulator having a nonlinear characteristic between a driving signal provided from the driving circuit and an optical output, the driving circuit comprising:
    a first differential amplifier configured to amplify a differential input signal and output the driving signal, the differential input signal including a positive-phase signal and a negative-phase signal each having more than two logic levels and a peak level, the logic levels having inter-level amplitudes between two neighbor logic levels, the inter-level amplitudes each being different from other inter-level amplitudes, the peak level being the highest level of the logic levels;
    a first peak detector configured to generate a first offset signal depending on the peak level of the positive-phase signal;
    a second peak detector configured to generate a second offset signal depending on the peak level of the negative-phase signal; and
    a DC-level equalizer configured to equalize the peak level of the positive-phase signal with the peak level of the negative-phase signal by superposing a first bias level on the positive-phase signal and a second bias level on the negative-phase signal,
    wherein the DC-level equalizer equalizes the peak level of the positive-phase signal with the peak level of the negative-phase signal based on the first offset signal and the second offset signal.

2. The driving circuit of claim 1, wherein the DC-level equalizer further includes a feedback differential amplifier configured to receive the first offset signal and the second offset signal, and to output a first control signal superposed on the positive-phase signal and a second control signal superposed on the negative-phase signal.

3. The driving circuit of claim 2,
    wherein the first differential amplifier has a non-inverting input that receives the positive-phase signal and an inverting input that receives the negative-phase signal,
    wherein the DC-level equalizer further includes a first resistor, a second resistor, a first current source, and a second current source, the first resistor being connected between a power line and the non-inverting input of the first differential amplifier, the second resistor being connected between the power line and the inverting input of the first differential amplifier, the first current source being connected between the non-inverting input of the first differential amplifier and ground, and the second current source being connected between the inverting input of the first differential amplifier and the ground, and
    wherein the feedback differential amplifier controls the first current source by the first control signal and the second current source by the second control signal.

4. The driving circuit of claim 3,
    wherein the DC-level equalizer decreases a current flowing in the first current source and increases another current flowing in the second current source, when the peak level of the positive-phase signal is lower than the peak level of the negative-phase signal, and
    wherein the DC-level equalizer increases the current flowing in the first current source and decreases the another current flowing in the second current source, when the peak level of the positive-phase signal is higher than the peak level of the negative-phase signal.

5. The driving circuit of claim 1,
    wherein the DC-level equalizer further includes a first Analog-to-Digital Converter (ADC), a second ADC, a first Digital-to-Analog Converter (ADC), a second ADC, and a controller,
    the controller equalizing the peak level of the positive-phase signal with the peak level of the negative-phase signal by receiving the first offset signal through the first ADC and the second offset signal through the second ADC, and
    the controller superposing the first control signal on the positive-phase signal through the first DAC and the second control signal on the negative-phase signal through the second DAC.

6. The driving circuit of claim 1, wherein the differential input signal includes four logic levels.

7. A driving circuit to drive an optical modulator having a nonlinear characteristic between a driving signal provided from the driving circuit and an optical output, the driving circuit comprising:
- a first differential amplifier configured to amplify a differential input signal and output the driving signal, the differential input signal including a positive-phase signal and a negative-phase signal each having more than two logic levels and a bottom level, the logic levels having inter-level amplitudes between two neighbor logic levels, the inter-level amplitudes each being different from other inter-level amplitudes, the bottom level being the lowest level of the logic levels;
- a first bottom detector configured to generate a first offset signal depending on the bottom level of the positive-phase signal;
- a second bottom detector configured to generate a second offset signal depending on the bottom level of the negative-phase signal; and
- a DC-level equalizer configured to equalize the bottom level of the positive-phase signal with the bottom level of the negative-phase signal by superposing a first bias level on the positive-phase signal and a second bias level on the negative-phase signal,
- wherein the DC-level equalizer equalizes the bottom level of the positive-phase signal with the bottom level of the negative-phase signal based on the first offset signal and the second offset signal.

8. A driving circuit to drive an optical modulator having an electro-absorption modulator by receiving a differential input signal and outputting a driving signal, the differential input signal having a positive-phase signal and a negative-phase signal and having more than two logic levels with inter-level amplitudes between two neighbor logic levels that are different from other inter-level amplitudes, the driving circuit compensating non-linearity in the optical modulator between the driving signal and an optical signal output from the optical modulator, and comprising:
- a pre-amplifier configured to output a differential intermediate signal by amplifying the differential input signal, the differential intermediate signal having a positive-phase signal and a negative-phase signal with an amplitude therebetween dependent on a difference between the positive-phase signal of the differential input signal and the negative-phase signal of the differential input signal;
- a main amplifier configured to output the driving signal by amplifying the differential intermediate signal, the driving signal having an amplitude dependent on a difference between the positive-phase signal of the differential intermediate signal and the negative-phase signal of the differential intermediate signal;
- a first peak detector configured to generate a first offset signal depending on the peak level of the positive-phase signal of the differential input signal;
- a second peak detector configured to generate a second offset signal depending on the peak level of the negative-phase signal of the differential input signal; and
- a DC-level equalizer configured to equalize a peak level of the positive-phase signal of the differential input signal with a peak level of the negative-phase signal of the differential input signal by receiving the differential intermediate signal and superposing a first bias level on the positive-phase signal of the differential input signal and a second bias level on the negative-phase signal of the differential input signal,
- wherein the DC-level equalizer equalizes the peak level of the positive-phase signal of the differential input signal with the peak level of the negative-phase signal of the differential input signal based on the first offset signal and second offset signal.

9. The driving circuit of claim 8, wherein the differential input signal includes four logic levels.

* * * * *